(12) United States Patent
Luo et al.

(10) Patent No.: US 8,318,384 B2
(45) Date of Patent: Nov. 27, 2012

(54) ANODE CATALYST AND METHODS OF MAKING AND USING THE SAME

(75) Inventors: Jing-Li Luo, Alberta (CA); Karl Tze-tang Chuang, Edmonton (CA); Zhengrong Xu, Edmonton (CA); Alan Sanger, Edmonton (CA)

(73) Assignee: The Governors of the University of Alberta, Edmonton, Alberta (CA)

( * ) Notice: Subject to any disclaimer, the term of this patent is extended or adjusted under 35 U.S.C. 154(b) by 279 days.

(21) Appl. No.: 12/597,808

(22) PCT Filed: Apr. 30, 2008

(86) PCT No.: PCT/CA2008/000804

§ 371 (c)(1),
(2), (4) Date: Oct. 27, 2009

(87) PCT Pub. No.: WO2008/131551

PCT Pub. Date: Nov. 6, 2008

(65) Prior Publication Data

US 2010/0143820 A1  Jun. 10, 2010

Related U.S. Application Data

(60) Provisional application No. 60/914,918, filed on Apr. 30, 2007.

(51) Int. Cl.
| | |
|---|---|
| H01M 4/02 | (2006.01) |
| H01M 4/36 | (2006.01) |
| H01M 4/48 | (2010.01) |
| H01M 8/10 | (2006.01) |
| B01J 23/10 | (2006.01) |
| B01J 23/00 | (2006.01) |

(52) U.S. Cl. ........ 429/523; 429/528; 429/488; 429/489; 502/303; 502/312; 502/319

(58) Field of Classification Search .................. 429/479, 429/484, 485, 488, 489, 523, 528, 532, 533; 502/303, 319, 312
See application file for complete search history.

(56) References Cited

U.S. PATENT DOCUMENTS

| | | | |
|---|---|---|---|
| 5,518,830 | A | 5/1996 | Worrell et al. |
| 5,803,934 | A | 9/1998 | Carter |
| 6,183,896 | B1 | 2/2001 | Horita et al. |
| 6,291,070 | B1 * | 9/2001 | Arpac et al. .................. 428/412 |
| 6,379,830 | B1 | 4/2002 | Sato et al. |
| 7,132,193 | B2 | 11/2006 | Fetcenko et al. |
| 2002/0098406 | A1 | 7/2002 | Huang et al. |
| 2004/0081893 | A1 * | 4/2004 | Hansen et al. ................. 429/321 |
| 2004/0204315 | A1 | 10/2004 | Krumpelt et al. |
| 2005/0153178 | A1 | 7/2005 | Ahmed et al. |
| 2005/0250000 | A1 | 11/2005 | Marina et al. |
| 2006/0089370 | A1 | 4/2006 | Shibutani et al. |

OTHER PUBLICATIONS

J. Primdahl, J.R. Hansen, L. Grahl-Madsen, P.H. Larsen. Sr-Doped LaCrO3 Anode for Solid Oxide Fuel Cells, J. Electrochem. Soc., 2001, 148(1), A74-A81.*
S.P. Simner, J.S. Hardy, J.W. Stevenson, T.R. Armstrong. Sintering of lanthanum chromite using strontium vanadate, Solid State Ionics 2000, 128, 53-63.*
X.Q. Wang, G.N. Ou, Y.Z. Yuan, Huaxue Xuebao, 62(18) (2004) 1695-1700.
L. Chen, B. Yang, X. Zhang, W. Dong, K. Cao, Cuihua Xuebao, 26(11) (2005) 1027-1030.
W. Daniell, A. Ponchel, S. Kuba, F. Anderle, T. Weingand, D.H. Gregory, H. Knoezinger, Topics in Catalysis, 20(1-4) (2002) 65-74.
J.D. Lee, N.K. Park, J.H. Jun, S.O. Ryu, T.J. Lee, Proceedings-Annual International Pittsburgh Coal Conference, 21st, (2004) 23.2/1-23.2/15.
Cheng.et al., Electrochemical and Solid State Letters, 9 (I) (2006) A31-A33.
D.W. Park, B.G. Kim, Proceedings-KORUS 2003, the Korea-Russia International Symposium on Science and Technology, 7th, 4 (2003) 123-129.
Xu et al., J. Phys. Chem. C, III (2007) 16679-16685.

* cited by examiner

*Primary Examiner* — Roy King
*Assistant Examiner* — Carlos Barcena
(74) *Attorney, Agent, or Firm* — Bereskin & Parr LLP/S.E.N.C.R.L., s.r.l.; Michael Fenwick

(57) ABSTRACT

The present disclosure relates to an ion conductive material useful as an anode catalyst comprising $LaCrO_3$, a vanadium oxide ($VO_x$) and a solid electrolyte, and methods of making the same. The catalysts are useful in solid oxide fuels cells and, in particular, using impure hydrogen.

32 Claims, 29 Drawing Sheets

ANODE CATALYST AND METHODS OF MAKING AND USING THE SAME

This application is a National Stage of International Application No. PCT/CA2008/000804, filed Apr. 30, 2008, which claims the benefit of Provisional Application No. 60/914,918 filed Apr. 30, 2007, the contents of which are herein incorporated by reference.

FIELD OF THE DISCLOSURE

The present disclosure relates to anode catalysts, methods for their preparation and uses thereof. In particular the anode catalysts comprise $LaCrO_3$, a vanadium oxide and a solid electrolyte and are useful for solid oxide fuel cells (SOFC) systems using several fuels including impure hydrogen, and related applications.

BACKGROUND

Vanadium oxide based catalysts have wide industrial applications. $V_2O_5$ is a good catalyst for oxidation. It can be used to selectively oxidize hydrocarbons[1,2,3] and to oxidize $H_2S$ to elemental sulfur.[4] It is also used for catalytic oxidation of $SO_2$ to $SO_3$ and for removal of $SO_2$ and $NO$.[5,6,7]

There are few applications of $V_2O_5$ in solid oxide fuel cells (SOFC) because of its low melting point (690° C.) and its tendency to be reduced in reducing environments, though some lower temperature SOFC applications have been investigated.[8,9] Vanadium oxide has multiple available oxidation states (+2, +3, +4, +5) and the lower oxidation state vanadium oxide compounds have much higher melting points more suitable for SOFC applications. Low oxidation state V-based catalysts have been studied for petroleum desulphurization.[10] Vanadium carbide has been reported as an anode catalyst for SOFC.[11] Vanadium doping was found to increase the sinterability of $La_xCa_yCrO_3$ (x+y=1, y>0).[12] This material was reported for use as an electrode layer on a solid electrolyte of a SOFC. A composite SOFC anode in which one of the components is a cerium-oxide phase that may be doped with niobium, vanadium, antimony or tantalum to enhance performance has been described.[13]

A major advantage of SOFC over low temperature fuel cells is that SOFCs can operate on less expensive fuel. An as yet unrealized potential commercial application of SOFC is for oxidizing of synthesis gas (or syngas) manufactured by steam reforming of hydrocarbons. Syngas is an important and relatively inexpensive energy vector. However, syngas so manufactured contains $H_2S$ derived from the sulfur content of the parent hydrocarbon, thus preventing use of the untreated syngas in fuel cells having conventional anodes such as Pt or Ni.[14,15] Purification of syngas by removal of $H_2S$[16] to a quality appropriate for use with conventional SOFC anode catalysts is expensive, and thus is a barrier to development of syngas SOFC.

The major combustible components of syngas are $H_2$ and CO, and these are oxidized according to the following reactions:

$$H_2 + \tfrac{1}{2}O_2 \rightarrow H_2O \qquad (1)$$

$\Delta H = -59.322$ kcal, $\Delta G = -43.766$ at 900° C.

$$CO + \tfrac{1}{2}O_2 \rightarrow CO_2 \qquad (2)$$

$\Delta H = -67.322$ kcal, $\Delta G = -43.152$ at 900° C.

Several research projects have been directed toward the application of either $H_2S$ free syngas or $H_2S$-containing $H_2$ as fuel in SOFC.[14,15,16] Other researchers used pure $H_2S$ as the fuel gas.[17,18]

SUMMARY OF DISCLOSURE

To use impure syngas as a fuel in SOFC it is important to find a catalyst which is both stable in a $H_2S$-rich environment and has the catalytic capability to activate both $H_2$ and CO. A new composite anode catalyst containing vanadium oxides has been developed and shown to have desirable levels of sustainable activity in solid oxide fuel cells. To suppress carbon deposition, undoped or doped $LaCrO_3$ was admixed into the new vanadium-based catalysts.

Accordingly, the present disclosure includes an anode catalyst comprising $LaCrO_3$ or doped $LaCrO_3$, a vanadium oxide and a solid electrolyte.

In another embodiment, the vanadium oxide has a chemical formula $VO_x$, wherein x is a number indicating the proportional amount of oxygen present in the oxide. In another embodiment, x is an integer from about 0.5 to about 2.5. In a further embodiment, x is an integer of about 1.5.

In an embodiment of the present disclosure, the $VO_x$ is obtained by the reduction of $V_2O_5$. In another embodiment, the $V_2O_5$ is reduced to $VO_x$ by reaction with hydrogen ($H_2$) gas at a temperature of about 400° C. to about 500° C., for a period of about 6 hours to about 10 hours. In another embodiment, the $V_2O_5$ is reduced with hydrogen ($H_2$) gas at a temperature of about 450° C. In a further embodiment, the $V_2O_5$ is reduced with hydrogen ($H_2$) gas for a period of about 8 hours. A person skilled in the art would recognize that other methods are available to prepare $VO_x$.

In another embodiment, the solid electrolyte is yttria-stabilized zirconia (YSZ). In a further embodiment, the YSZ is 8 mol % YSZ nano-powder. Other materials known to those skilled in the art may be used as the solid electrolyte.

In an embodiment of the disclosure, the doped $LaCrO_3$ is $LaCrO_3$ doped with a promoter. For example, the $LaCrO_3$ component may be promoted by partial substitution of a metal, such as strontium, magnesium or cobalt, for chromium. Suitably the metal is strontium. In a further embodiment, the doped $LaCrO_3$ is a material having a formula of about $La_{1-y}M_yCrO_{3-0.5y}$, where y is from about 0 to about 0.5. In another embodiment, the doped $LaCrO_3$ is $La_{0.7}Sr_{0.3}CrO_{2.85}$.

In an embodiment of the disclosure, the anode catalyst comprises $LaCrO_3$ or doped $LaCrO_3$ present in an amount of about 10% to about 50% by weight, vanadium oxide present in an amount of about 30% to about 70% by weight and a solid electrolyte present in an amount of about 10% to about 30% by weight. In another embodiment, the $LaCrO_3$ or doped $LaCrO_3$ is present in an amount of about 30% to about 50% by weight, the vanadium oxide is present in an amount of about 30% to about 50% by weight and solid electrolyte is present in an amount of about 15% to about 25% by weight. In a further embodiment, the $LaCrO_3$ or doped $LaCrO_3$ is present in an amount of about 40% by weight, the vanadium oxide is present in an amount of about 40% by weight and solid electrolyte is present in an amount of about 20% by weight.

In another embodiment of the present disclosure, the anode catalyst further comprises an additive. In an embodiment, the additive is selected from one or more of a promoter, an alkali metal salt, a stabilizer, a diluent, an electronic conductor, an ion conductor, a hardener and a surface area agent. In a further embodiment of the present disclosure, the additive comprises an alkali metal salt, for example, a potassium salt.

The present disclosure also includes a method of preparing an anode catalyst. Accordingly, the present disclosure is directed to a method of preparing an anode catalyst comprising:

(a) combining $LaCrO_3$ or doped $LaCrO_3$, a vanadium oxide and a solid electrolyte in a solvent; and (b) allowing the combination from (a) to dry.

In another embodiment of the present disclosure, the $LaCrO_3$ or doped $LaCrO_3$, the vanadium oxide, the solid electrolyte and solvent are combined in an ultrasonic bath to thoroughly mix the components of the composition.

In an embodiment of the disclosure, the solvent is an alcohol. In a further embodiment, the solvent is iso-propanol.

In an embodiment of the disclosure, the doped $LaCrO_3$ is $LaCrO_3$ doped with a promoter. For example, the $LaCrO_3$ component may be promoted by partial substitution of a metal, such as strontium, magnesium or cobalt, for chromium. Suitably the metal is strontium. In a further embodiment, the doped $LaCrO_3$ is a material having a formula of about $La_{1-y}M_yCrO_{3-0.5y}$, where y is from about 0 to about 0.5. In another embodiment, the doped $LaCrO_3$ is $La_{0.7}Sr_{0.3}CrO_{2.85}$.

In an embodiment of the disclosure, the anode catalyst is prepared using $LaCrO_3$ or doped $LaCrO_3$ in an amount of about 10% to about 50% by weight, vanadium oxide in an amount of about 30% to about 70% by weight and a solid electrolyte in an amount of about 10% to about 30% by weight. In another embodiment, the $LaCrO_3$ or doped $LaCrO_3$ is used in an amount of about 30% to about 50% by weight, the vanadium oxide is used in an amount of about 30% to about 50% by weight and solid electrolyte is used in an amount of about 15% to about 25% by weight. In a further embodiment, the $LaCrO_3$ or doped $LaCrO_3$ is used in an amount of about 40% by weight, the vanadium oxide is used in an amount of about 40% by weight and solid electrolyte is used in an amount of about 20% by weight.

In another embodiment of the present disclosure, the method of preparing an anode catalyst further comprises addition of an additive. In an embodiment, the additive is selected from one or more of a promoter, an alkali metal salt, a stabilizer, a diluent, an electronic conductor, an ion conductor, a hardener and a surface area agent. In a further embodiment of the present disclosure, the additive comprises an alkali metal salt, for example, a potassium salt.

In an embodiment of the disclosure, the combined vanadium oxide, $LaCrO_3$ or doped $LaCrO_3$ and solid electrolyte are dried by evaporation of the solvent.

The catalysts of the present disclosure are electric conductors at elevated temperatures and therefore can be used in any application where such materials are needed. For example, the catalysts may be used in a heating unit in an oven, in electrodes for zirconia-based oxygen sensors and in connectors or anodes in SOFCs. In a particular embodiment, the catalysts are used in an anode of a SOFC.

Accordingly, in an embodiment of the disclosure, a solid oxide fuel cell is included comprising (a) an anode comprising an anode catalyst of the present disclosure;

(b) a cathode; and (c) an electrolyte providing ionic conduction between the anode and the cathode.

The present disclosure is also directed to a method of oxidizing a hydrogen containing fuel. Accordingly, the present disclosure includes a method of oxidizing a hydrogen containing fuel comprising passing a gas stream comprising the fuel through a SOFC, wherein the SOFC comprises an anode catalyst of the present disclosure. In another embodiment, the hydrogen-containing fuel also contains at least one of carbon monoxide, hydrogen sulfide or a hydrocarbon. In a further embodiment, the hydrogen-containing fuel further contains carbon monoxide. In an embodiment of the disclosure, the hydrogen-containing fuel is syngas.

In another embodiment, the gas stream is humidified.

The present disclosure is also directed to the use of an anode catalyst of the present disclosure. Accordingly, the present disclosure includes a use of an anode catalyst of the present disclosure in a solid oxide fuel cell for the oxidation of a hydrogen-containing fuel. In a further embodiment, the hydrogen-containing fuel also contains at least one of carbon monoxide, hydrogen sulfide or a hydrocarbon. In an embodiment of the disclosure, the hydrogen-containing fuel is syngas.

Other features and advantages of the present invention will become apparent from the following detailed description. It should be understood, however, that the detailed description and the specific examples while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

The disclosure will now be described in relation to the drawings in which.

DETAILED DESCRIPTION

(I) Definitions

Figure 1:
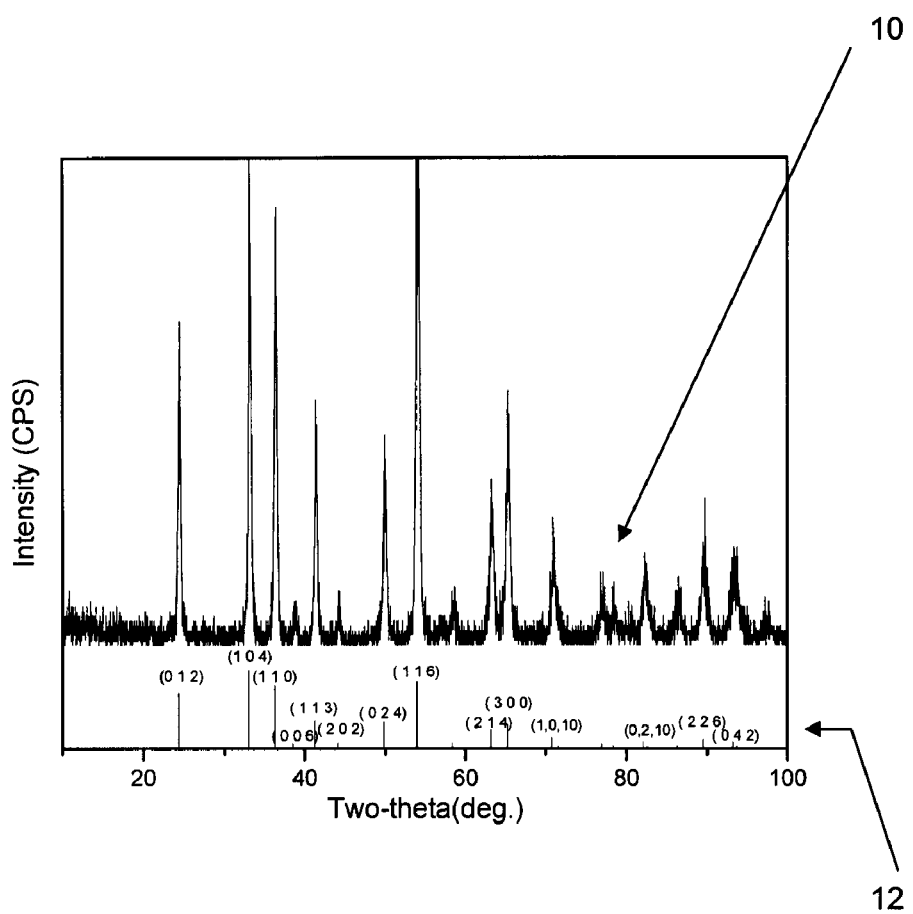
FIG. 1 shows an XRD pattern of synthesized $VO_X$ and Karelianite $V_2O_3$.

The term "a vanadium oxide" refers to the oxides of vanadium of the chemical formula $VO_x$, wherein x represents a number indicating the proportional amount of oxygen present in the oxide and is a positive integer of about 0.5 to about 2.5. The value of x is dependent upon the method in which the vanadium oxides are produced.

The term "anode" refers to the portion of the fuel cell that oxidizes a fuel. As an example, when hydrogen gas is the fuel, the anode oxidizes the hydrogen to protons and electrons.

The term "cathode" refers to the portion of the fuel cell that reduces oxygen to oxygen ions.

The term "additive" refers to any additional element, compound or material which is added to the anode catalyst composition.

The term "promoter" refers to a dopant or additive that promotes the activity of at least one of the components of the catalyst of the disclosure.

The term "alkali metal" refers to the Group I metals of the periodic table, and includes lithium, sodium, potassium, rubidium and cesium. Typically, when an alkali metal is used as an additive it is present as a salt comprising unipositive ions, for example, $K^+$.

The term "stabilizer" refers to any additive that improves the physical or chemical integrity of the material, herein the anode catalyst. Stabilizers can be of various forms.

The term "diluent" refers to an additive that does not itself participate in the chemical changes of the process, and which may serve other purposes such as controlling and/or improving heat and/or mass transfer needs.

The terms "electronic conductor" and "ionic conductor" refers to an additive that enables and/or enhances electronic and ionic conductivity respectively. It will be recognized that some materials exhibit both electronic and ionic conductivity.

The term "hardener" refers to an additive which increases the hardness of the catalyst so as to improve resistance to abrasion and/or fracture. For example, $B_2O_3$ can be added to the composition in an amount of about 0.5% by weight.

The term "surface area agent" refers to an additive that is incorporated into a manufacturing process so as to increase the surface area of the anode catalyst. For example, in the manufacture of anode catalysts according to the present disclosure, the surface area agent may be an organic compound or polymer that becomes interspersed with the materials of the anode catalyst which is then removable by heat treatment or combustion.

The term "dry" or "dried" refers to a catalysts composition which is substantially free from solvent. Substantially free from solvent means a catalyst which has less than 5% by weight of the solvent, suitably, amounts of solvent that are very low or undetectable.

The term "solvent" refers to a substance which can dissolve and/or disperse at least one of the components of the catalyst. Examples of suitable solvents include alcohols.

The term "alcohol" refers to an alcohol having from 1 to 10 carbon atoms, wherein the carbon atoms can be straight, branched and/or cyclic alkyl groups and includes methanol, ethanol, propanol, iso-propanol, n-butanol, s-butanol, i-butanol, t-butanol, pentanol and the like.

(II) Catalysts of the Disclosure

New, highly active and stable anode catalysts have been developed for solid oxide fuel cell systems that are able to utilize a variety of different fuels including impure hydrogen as a fuel source. In particular, the anode catalyst is chemically stable in $H_2S$-rich syngas or hydrogen fuel. The new catalyst has a formula $LaCrO_3$—$VO_x$—YSZ, with the $LaCrO_3$ component being doped or undoped. Impedance spectra showed that the anode polarization resistance decreased in the presence of CO. Current density of 450 $mA/cm^2$ at 0.6 V and maximum power density of 260 $mW/cm^2$ (at 450 $mA/cm^2$) were obtained at 1173 K. XRD and XPS analysis showed that the new catalyst was chemically stable in rich $H_2S$ syngas or hydrogen.

Accordingly, the present disclosure includes an anode catalyst for a solid oxide fuel cell (SOFC) comprising $LaCrO_3$ or doped $LaCrO_3$, a vanadium oxide and a solid electrolyte.

In an embodiment of the disclosure, the vanadium oxide has a chemical formula $VO_x$, wherein x is a number indicating the proportional amount of oxygen present in the oxide. In another embodiment, x is an integer from about 0.5 to about 2.5. In a further embodiment, x is an integer of about 1.5. A person skilled in the art would appreciate that the value of x will depend on the conditions and method for the preparation of the vanadium oxide.

In an embodiment of the present disclosure, the $VO_x$ is obtained by the reduction of $V_2O_5$. In an embodiment, the $V_2O_5$ is reduced by reaction with hydrogen ($H_2$) gas at a temperature of about 400° C. to about 500° C., for a period of about 6 hours to about 10 hours. In another embodiment, the $V_2O_5$ is reduced with hydrogen ($H_2$) gas at a temperature of about 450° C. In a further embodiment, the $V_2O_5$ is reduced with hydrogen ($H_2$) gas for a period of about 8 hours. $VO_x$ so prepared typically has a value for x that is about 1.5. It will be understood by a person skilled in the art however, that the value of x may vary depending on a number of conditions, including reaction temperature and time. It will be further recognized by those skilled in the art that there are other methods that may be used to prepare oxides of vanadium having reduced oxidation states. The identity of the $VO_x$ as produced by a certain reaction is determined, for example, by X-ray diffraction (XRD) and/or X-ray photoelectron spectroscopy (XPS).

In another embodiment, the solid electrolyte is yttria-stabilized zirconia (YSZ). In a further embodiment, the YSZ is 8 mol % YSZ nano-powder.

In an embodiment of the disclosure, the doped $LaCrO_3$ is $LaCrO_3$ doped with a promoter. For example, the $LaCrO_3$ component may be promoted by partial substitution of a metal, such as strontium, magnesium or cobalt, for chromium. Suitably the metal is strontium. In a further embodiment, the doped $LaCrO_3$ is a material having a formula of about $La_{1-y}M_yCrO_{3-0.5y}$, where y is from about 0 to about 0.5. This range of about 0 to about 0.5 represents the degree of substitution of the metal M for La in the doped materials. In another embodiment, the doped $LaCrO_3$ is $La_{0.7}Sr_{0.3}CrO_{2.85}$.

In an embodiment of the disclosure, the anode catalyst comprises $LaCrO_3$ or doped $LaCrO_3$ present in an amount of about 10% to about 50% by weight, vanadium oxide present in an amount of about 30% to about 70% by weight and a solid electrolyte present in an amount of about 10% to about 30% by weight. In another embodiment, the $LaCrO_3$ doped $LaCrO_3$ is present in an amount of about 30% to about 50% by weight, the vanadium oxide is present in an amount of about 30% to about 50% by weight and solid electrolyte is present in an amount of about 15% to about 25% by weight. In a further embodiment, the $LaCrO_3$ or doped $LaCrO_3$ is present in an amount of about 40% by weight, the vanadium oxide is present in an amount of about 40% by weight and solid electrolyte is present in an amount of about 20% by weight.

Without being bound by theory, the vanadium oxide of the anode catalyst of the present disclosure provides the catalytic activity to oxidize the fuel that is supplied to the fuel cell. In an embodiment, the vanadium oxide oxidizes hydrogen gas ($H_2$) to its respective protons and electrons. In another embodiment, the vanadium oxide oxidizes hydrogen sulfide ($H_2S$) to elemental sulfur, as well as the respective protons and electrons. In a further embodiment, the vanadium oxide oxidizes carbon monoxide so that it forms carbon dioxide.

Again without being bound by theory, $LaCrO_3$ or doped $LaCrO_3$ acts as a promoter for increasing the catalytic activity of the vanadium oxide. In an embodiment, the $LaCrO_3$ or doped $LaCrO_3$ of the present disclosure increases at least one of the number or activity of the vanadium oxide adsorption sites where the catalytic reaction occurs, and therefore increases the catalytic activity of the vanadium oxide.

In another embodiment, the solid electrolyte is included in the catalyst composition to increase the ion conductivity of the anode catalyst. In an embodiment, when the vanadium oxide oxidizes, for example, hydrogen gas ($H_2$), the resultant products are protons and electrons. The positively charged protons are then conducted through the solid electrolyte of the anode catalyst to the electrolyte separating the anode and the cathode, wherein the protons combine with oxygen to form water. In an embodiment, the solid electrolyte of the anode catalyst composition improves the ability of the anode to conduct the ions to the electrolyte separating the anode and the cathode.

In another embodiment of the present disclosure, the anode catalyst further comprises an additive. In an embodiment, the additive is selected from one or more of a promoter, an alkali metal salt, a stabilizer, a diluent, an electronic conductor, an ion conductor, a hardener and a surface area agent.

In another embodiment, the additive is a promoter of at least one of the components of the catalyst. In another embodiment of the present disclosure, the additive is an alkali metal salt. In another embodiment, the alkali metal salt comprises a potassium salt. Without being bound by theory, when carbon monoxide (CO) forms part of the fuel, carbon deposition on the anode catalyst compromises the fuel cell performance. The addition of an alkali metal, for example potassium salts, reduces a propensity for the formation of carbon deposition on the anode catalyst, therefore allowing the fuel cell to better maintain maximum power density.

(III) Methods of the Disclosure

There is also included in the present disclosure a method of preparing an anode catalyst, in particular for a solid oxide fuel cell (SOFC).

Accordingly, the method of the present disclosure comprises:

(a) combining $LaCrO_3$ or doped $LaCrO_3$, a vanadium oxide and a solid electrolyte in a solvent; and (b) allowing the combination from (a) to dry.

In another embodiment of the present disclosure, the vanadium oxide, $LaCrO_3$ or doped $LaCrO_3$, solid electrolyte and solvent are combined, for example, in an ultrasonic bath so that the composition is thoroughly mixed.

In an embodiment, the solvent is an alcohol. In a further embodiment, the solvent is iso-propanol.

In an embodiment of the disclosure, the doped $LaCrO_3$ is $LaCrO_3$ doped with a promoter. For example, the $LaCrO_3$ component may be promoted by partial substitution of a metal, such as strontium, magnesium or cobalt, for chromium. Suitably the metal is strontium. In a further embodiment, the doped $LaCrO_3$ is a material having a formula of about $La_{1-y}M_yCrO_{3-0.5y}$, where y is from about 0 to about 0.5. In another embodiment, the doped $LaCrO_3$ is $La_{0.7}Sr_{0.3}CrO_{2.85}$.

In an embodiment of the disclosure, the anode catalyst is prepared using $LaCrO_3$ or doped $LaCrO_3$ in an amount of about 10% to about 50% by weight, vanadium oxide in an amount of about 30% to about 70% by weight and a solid electrolyte in an amount of about 10% to about 30% by weight. In another embodiment, the $LaCrO_3$ or doped $LaCrO_3$ is used in an amount of about 30% to about 50% by weight, the vanadium oxide is used in an amount of about 30% to about 50% by weight and solid electrolyte is used in an amount of about 15% to about 25% by weight. In a further embodiment, the $LaCrO_3$ or doped $LaCrO_3$ is used in an amount of about 40% by weight, the vanadium oxide is used in an amount of about 40% by weight and solid electrolyte is used in an amount of about 20% by weight.

In another embodiment of the present disclosure, the method of preparing an anode catalyst further comprises addition of an additive. In an embodiment, the additive is selected from one or more of a promoter, an alkali metal salt, a stabilizer, a diluent, an electronic conductor, an ion conductor, a hardener and a surface area agent. In a further embodiment of the present disclosure, the additive is an alkali metal salt, for example, a potassium salt.

In an embodiment of the disclosure, the combined vanadium oxide, $LaCrO_3$ or doped $LaCrO_3$ and solid electrolyte are dried by evaporation of the solvent. Conditions to evaporate the solvent will vary depending, for example, on the identity of the solvent, the temperature, humidity and pressure, as would be known to a person skilled in the art.

(IV) Use of the Anode Catalyst

The catalysts of the present disclosure are electric conductors at elevated temperatures and therefore can be used in any application where such materials are needed. For example, the catalysts may be used in a heating unit in an oven, in electrodes for zirconia-based oxygen sensors and in connectors or anodes in SOFCs and related uses. In a particular embodiment, the catalysts are used in an anode of a SOFC.

Accordingly, in an embodiment of the disclosure, a solid oxide fuel cell is disclosed comprising
(a) an anode comprising an anode catalyst of the present disclosure;
(b) a cathode; and
(c) an electrolyte providing ionic conduction between the anode and the cathode.

In an embodiment of the present disclosure, the anode catalyst is applied to the electrolyte material by grinding the dried catalyst and forming the ground catalyst into a paste, for example, by mixing with α-terpineol. In a further embodiment the electrolyte material is YSZ.

In an embodiment of the present disclosure, a solid oxide fuel cell comprising the anode catalyst of the present disclosure is included. It will be recognized that there can be several possible architectures, including curved and cylindrical architectures, without deviating from the principles of the disclosure.

The present disclosure also relates to a method of oxidizing a hydrogen-containing fuel comprising passing a gas stream comprising the fuel through a SOFC, wherein the SOFC comprises an anode catalyst of the present disclosure. In an embodiment, the anode catalysts of the present disclosure are useful for catalyzing the oxidation impure hydrogen-containing fuels, for example, synthesis gas or syngas. In an embodiment, the hydrogen-containing fuel also contains hydrogen sulfide ($H_2S$).

In another embodiment of the invention, the hydrogen-containing fuel also contains carbon monoxide (CO) in an amount from about 0.5% to about 60%. In another embodiment, CO is present in an amount from about 20% to about 50%.

In another embodiment, the hydrogen-containing fuel is humidified.

The following non-limiting examples are illustrative of the invention:

EXPERIMENTAL EXAMPLES

Materials

Example 1

Figure 2:
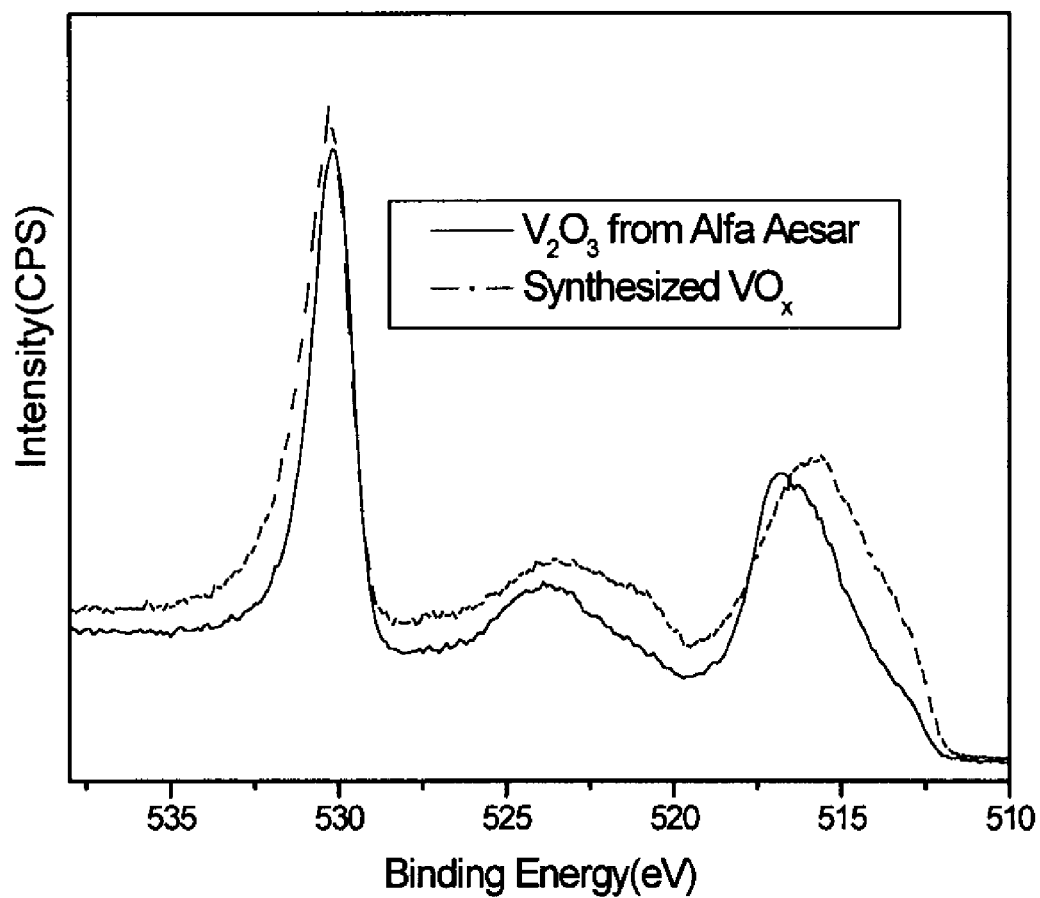
FIG. 2 shows the binding energy of O1s and V2p from synthesized $VO_X$ and $V_2O_3$.

Catalyst Preparation (i) Preparation of $V_2O_5$ $V_2O_5$ was reduced in pure $H_2$ gas under 450° C. for 8 hours to obtain $VO_X$ as black powder. FIG. 1 shows the XRD patterns of the $VO_X$ so prepared at 10, and that for Karelianite $V_2O_3$ (from database Jade V.7) at 12. While the main peaks for $VO_X$ match the peaks for Karelianite, the formula $VO_X$ was used instead of $V_2O_3$ as there were also several additional small peaks in the XRD, and XPS analysis also showed the presence of different V species. FIG. 2 shows the XPS for O1s and V2p electrons from synthesized $VO_X$ and pure $V_2O_3$. The binding energy of O1s and V2p electrons from synthesized $VO_X$ differ slightly from those of pure $V_2O_3$.

(ii) Preparation of Undoped $LaCrO_3$ Catalyst

The $VO_X$ from the prior step, $LaCrO_3$ and 8 mol % YSZ nano-powder were intimately mixed in 40:40:20 weight ratio in iso-propanol in an ultrasonic bath for 1 hour. The dry composite anode catalyst $LaCrO_3$—$VO_X$—YSZ remained after iso-propanol evaporated naturally.

(iii) Preparation of Doped $LaCrO_3$ Catalyst

The method for preparing a catalyst with a dopant is the same for preparing undoped formulations as in part (ii). Doped $La_{1-o}M_oCrO_{3-0.5o}$ (M=Sr, Mg or Co) was synthesized using a solid state reaction.[19,20] The stoichiometric oxide materials (Alfa Aeser, 99.5%) were mixed together and then ball milled for 24 hours. The powder mixtures were dried at 200° C. and then sequentially calcined in air at 800° C. for 2 hours and heated to 1300° C. for 12 hours.

An exemplary doped catalyst, $La_{0.7}Sr_{0.3}CrO_{2.85}$, was then compared with $LaCrO_3$ as anode catalyst. The corresponding partly substituted perovskites having Co or Mg as substituents for La, instead of Sr, showed lower initial performance. Composite catalysts were prepared by intimately mixing together $VO_X$, $La_{1-o}Sr_oCrO_{3-0.5o}$, and 8 mol % YSZ nano-powder (Inframat Advanced Materials) in 40:40:20 weight ratio in iso-propanol in an ultrasonic bath for 1 hour. Dry anode catalyst $La_{0.7}Sr_{0.3}SrO_{2.85}$—$VO_X$—YSZ remained after the iso-propanol had evaporated.

Example 2

Cell Preparation

Figure 3:
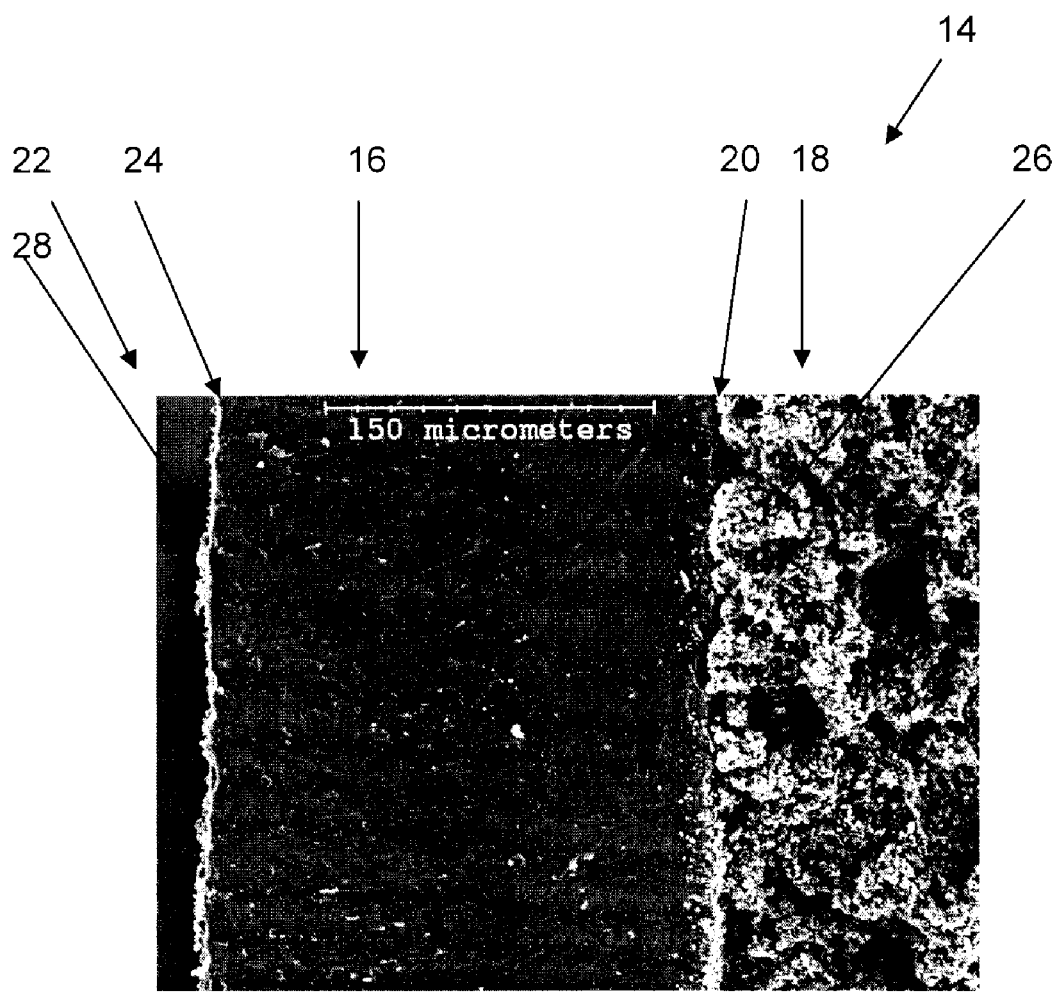
FIG. 3 shows a cross-sectional SEM image of a fuel cell assembly according to one embodiment of the present disclosure.
Figure 4:
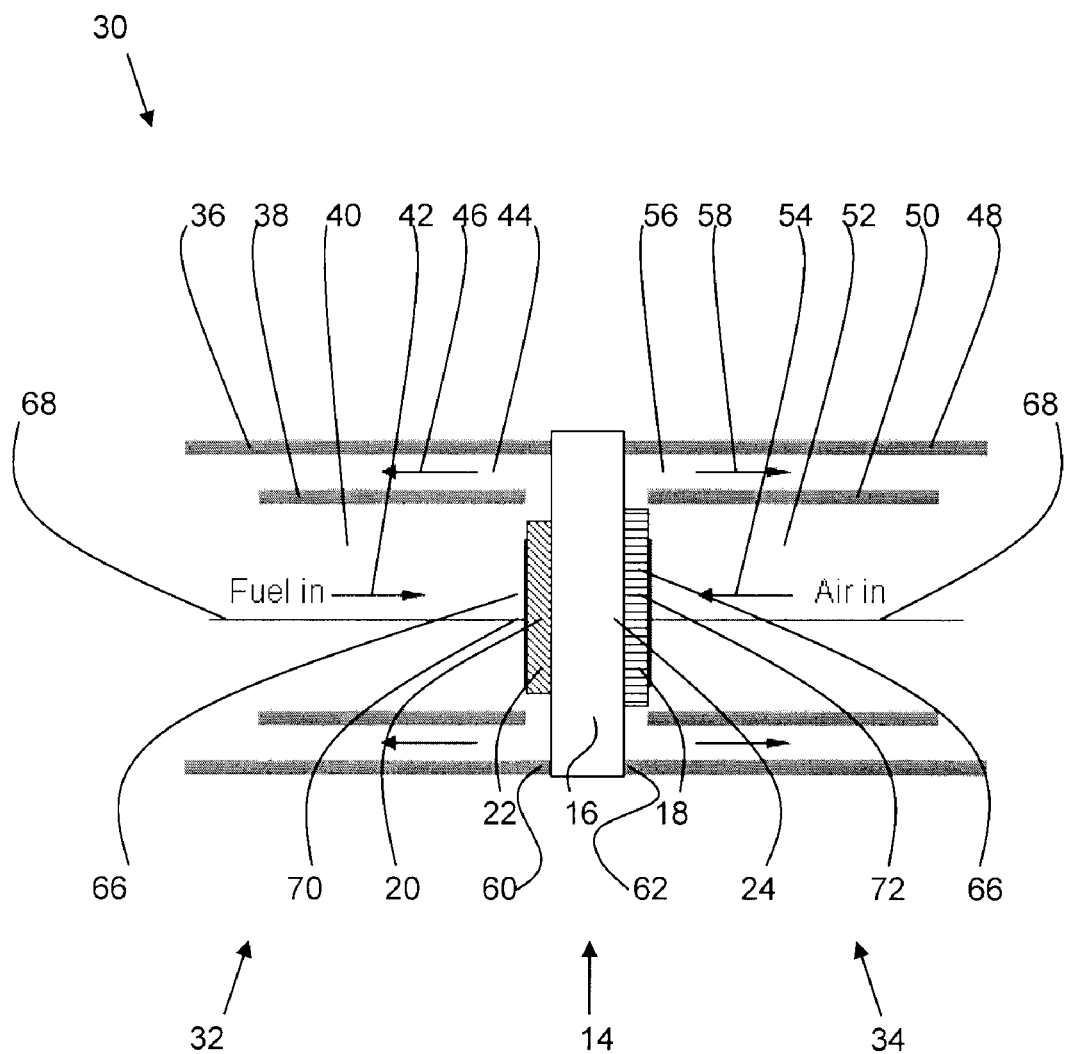
FIG. 4 is a schematic representation of a laboratory fuel cell according to one embodiment of the present disclosure.

Referring to FIG. 3, a fuel cell membrane assembly 14 comprises an ion-conducting electrolyte membrane layer 16 to which an anode layer 18 is bonded to a first face 20 of membrane layer 16 and a cathode layer 22 is bonded to a second face 24 of membrane layer 16. In FIGS. 3 and 4, membrane assembly 14 is illustrated as being planar. It will be recognized that there can be alternative architectures, including curved and cylindrical architectures, without deviating from the principles of the invention.

Dense pellets (2.54 cm in diameter and 0.3 mm in thickness) of 8 mol % YSZ were used as electrolyte 16 as seen in FIG. 3. Porous platinum was used as cathode catalyst 28, prepared by screen printing platinum paste (Heraeus CL11-5100) on to one side of the YSZ pellets. After drying in air for 3 hours, it was further heated in air at 850° C. for 30 minutes to form porous cathode 22.

The dry anode composite catalyst 26 was ground and mixed with α-terpineol to form a viscous paste that was screen printed on to the second side of the electrolyte pellets. The apparent anode surface area was 1 $cm^2$ and the anode 18 thickness was approximately 0.15 mm. FIG. 3 shows a cross section view SEM image of the fuel cell assembly 20. Pt layer 22 was very thin compared to the thickness of anode layer 18.

FIG. 4 is a schematic representation of a laboratory fuel cell 30. Fuel cell 30 comprises an anode compartment 32 and a cathode compartment 34 at opposite sides of membrane assembly 14. A cylindrical architecture is illustrated for non-limiting exemplary purposes. Anode compartment 32 has an outer wall 36 and an inner dividing wall 38 separating an inlet passage 40 through which fuel 42 is fed and an outlet passage 44 through which effluent 46 is vented. Similarly, cathode compartment 34 has an outer wall 48 and an inner dividing wall 50 separating an inlet passage 52 through which oxidant is passed, where here the illustrated oxidant is air 54, and an outlet passage 56 through which effluent 58 is vented. In the illustrated embodiment, inlet passages 40, 52 and outlet passages 44, 56 are coaxial.

Gold mesh 66 welded to a Au lead wire 68 was placed in intimate contact with the surfaces 70, 72 of each electrode 18, 22. The rims 60, 62 of YSZ electrolyte layer 16 had no catalyst deposited at the faces 20, 24 of either side. Catalyst-electrolyte membrane assembly 14 was secured at the rim of electrolyte 16 between the two coaxial outer walls 36, 48. When walls 36, 48 were alumina tubes and electrolyte 16 was YSZ, said tubes were sealed to membrane assembly 14 using ceramic sealant (Ceramabond 503, Aremcosame) on both sides of electrolyte 16 to seal the respective gas compartments 32, 34, as illustrated in FIG. 4.

The fuel cell was heated in a tubular furnace (Thermolyne F79300) (not illustrated). Initially, air and nitrogen flowed through cathode chamber 34 and anode chamber 32, respectively. After the operating temperature had been reached, anode feed 42 was switched from nitrogen to $H_2S$-containing syngas.

Example 3

Electrochemical Apparatus

In all tests a Solartron Electrochemical interface (S1 1287) was used to monitor the open circuit voltage (OCV) between anode 18 and cathode 22, and to measure current-potential performance and electrochemical impedance. Potentiodynamic mode was used when performing current-potential measurements. The scanning rate was 5 mV/s. Impedance data typically were obtained over the frequency range 1 MHz to 0.1 Hz. The cell was allowed to equilibrate and stabilize for at least 1 hour after each change in operating conditions before conducting further measurements. Gas analysis of anode effluent streams 58 was performed periodically during fuel cell experiments using gas chromatography (GC, HP5890).

Example 4

SEM of Catalyst Surface

Figure 5:
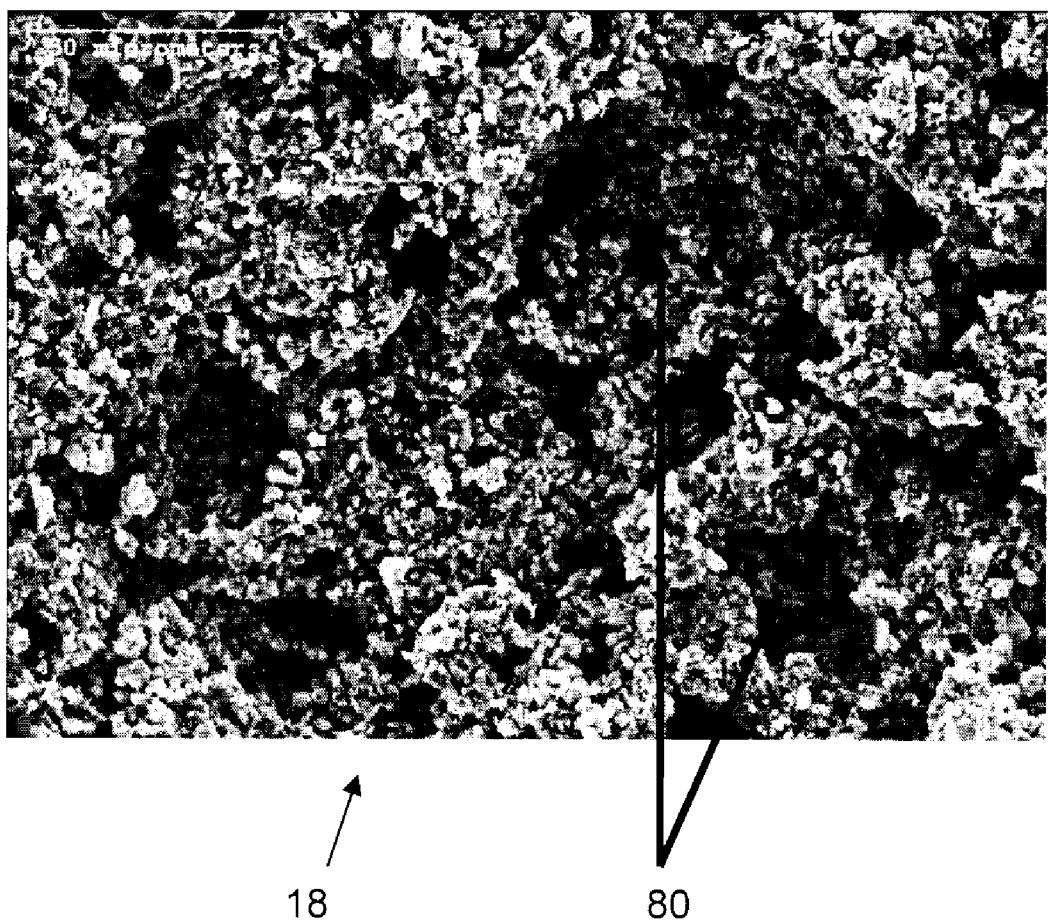
FIG. 5 shows an SEM image of the anode surface area according to one embodiment of the present disclosure.
Figure 6:
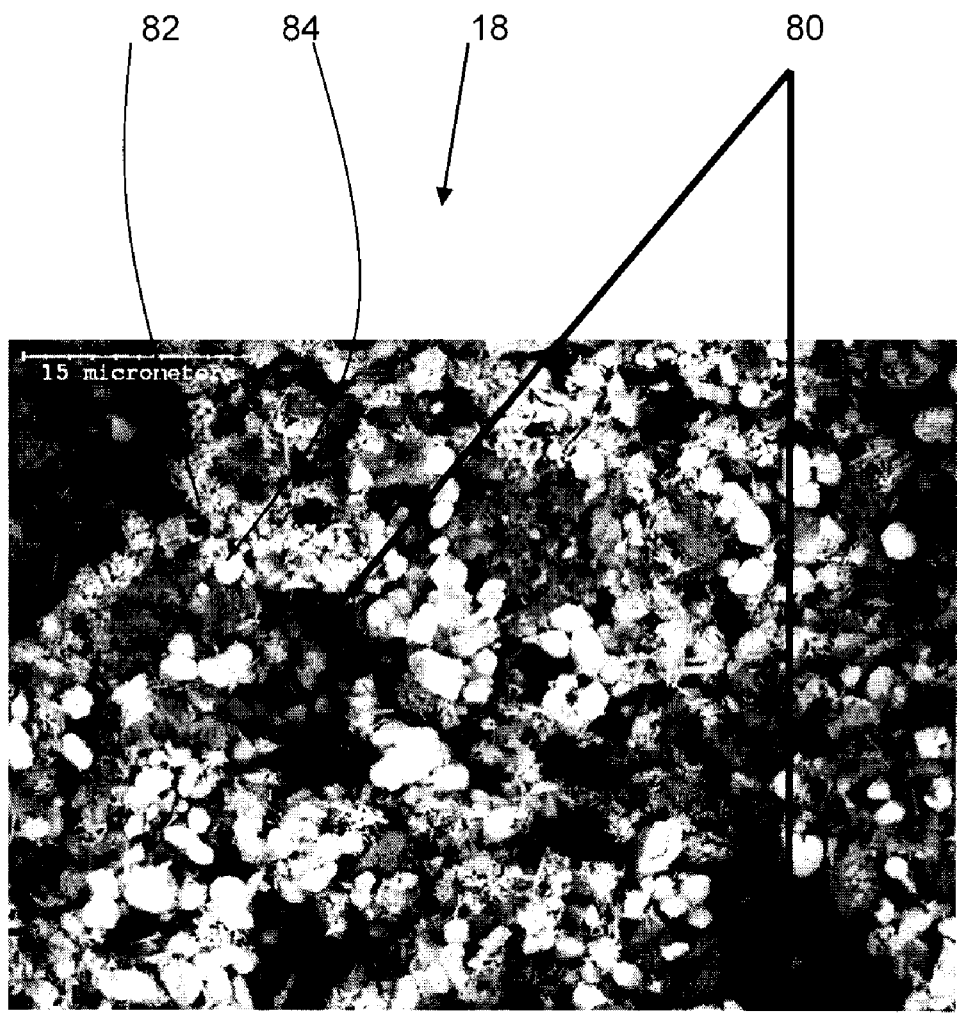
FIG. 6 shows an SEM image of the anode surface with higher magnification according to one embodiment of the present disclosure.

FIGS. 5 and 6 show SEM images of the anode catalyst. FIG. 5 shows that the porous anode layer 18 contained numerous cavities 80 providing both high surface area and facile mass transfer. FIG. 6, at higher magnification, shows the intimate contact and distribution of the anode layer 18 components, and the resulting high triple phase boundary (TPB). The TPB is the boundary at which a catalyst, an electrolyte and one or more gas phase reactants interact. The fine needles 82 are nano YSZ powder, provided to improve ion conductivity. The small balls 84 are $LaCrO_3$ particles. $VO_X$ powder was mixed evenly throughout the anode. The three phases' even distribution is a desirable precondition for good electrochemical performance. While not wishing to be limited by theory, it is according to triple phase boundary theory that the electrochemical reactions take place at the boundary to generate electrons and ions from the reactions, which then are conducted away from the reaction sites via their respective conductors.

Example 5

Measured and Calculated OCV

Table 1 shows the measured OCV values at 800° C., 850° C. and 900° C. using two different test gases over a range of temperatures. The OCV using syngas were higher than those using $H_2$ having the same concentration of $H_2S$ impurity at all temperatures. However, the E° (T) of hydrogen was very close to that of CO at 800° C., and even a little higher at 850° C. and 900° C. (see Table 2). Thus the effect of the presence of CO in promoting OCV was not simply due to the oxidation reactions occurring at the anode.

The equilibrium potentials for reactions (1) and (2) can be expressed by the following respective Nernst equations (3) and (4):

$$E_N = E°(T) - \frac{RT}{2F} \ln\left(\frac{P_{H_2O}}{P_{H_2} P_{O_2}^{1/2}}\right) \quad (3)$$

$$E_N = E°(T) - \frac{RT}{2F} \ln\left(\frac{P_{CO_2}}{P_{CO} P_{O_2}^{1/2}}\right) \quad (4)$$

where E° (T) is the cell potential calculated from thermodynamic data)(ΔG° at standard conditions, i.e. the potential when the partial pressures of all reactants and products are 1 atmosphere. The relationship of E° (T) and ΔG° (T) is:

$$-\Delta G°(T) = nFE°(T) \quad (5)$$

The potential calculated using the Nernst equation is related to the open circuit voltage (OCV), as no current is drawn.

The 5000 ppm $H_2S$ in the feed gas also may be oxidized (Equations 6, 7), and so has capability to contribute slightly to the overall cell potential.

$$H_2S + \frac{1}{2}O_2 \rightarrow H_2O + \frac{1}{2}S_2 \quad (6)$$

$$H_2S + \frac{3}{2}O_2 \rightarrow H_2O + SO_2 \quad (7)$$

The equilibrium potentials for reactions (6) and (7) are expressed by the following Nernst equations (8) and (9):

Because the electrochemical exchange current density ($i_o$) is limited for reactions (6) and (7), it was reasonable to assume that the concentrations of sulfur dioxide and sulfur were each less than 10 ppm in the anode chamber at open circuit condition to calculate their contribution to the overall cell performance.[21] The OCV values of reactions (6) and (7) have lower impact on the measured OCV compared with reactions (1) and (2). The measured OCV comprised mixed OCV of all of reactions (1), (2), (6) and (7). Thus several factors of each reaction influenced the measured OCV, including concentrations and exchange current densities. Under mixed OCV conditions, the values for OCV differed from the OCV of specific reactions, and some reactions were polarized. In the present tests, because of the very low concentration (5000 ppm) and low exchange current density of $H_2S$, reactions (6) and (7) were more easily polarized compared to reactions (1) and (2), and so their polarization voltage had lesser influence on the final mixed OCV value. Consequently, to simplify calculations, the relatively insignificant influence of reactions (6) and (7) on the final mixed OCV value was neglected.

Partial pressures of products were required for calculation of potentials. Vapor pressures of $H_2O$ were measured by GC, and were approximately 0.03 atmosphere at open circuit conditions, which was the saturated vapor pressure at room temperature, because of larger exchange current density ($i_o$) of $H_2$. The $CO_2$ partial pressure was approximately 0.005 atmosphere at open circuit conditions.

E° was calculated using equation (5) and thermodynamic data ($\Delta G°$ (T), HSC Chemistry Software, Version 5.1, Outokumpu Research), and then the contributions to the overall potential arising from reactions (1) and (2) were calculated. Table 2 shows the respective E° (T) and E(T) at each testing temperature.

The measured (mixed) OCV arose primarily from these two reactions at each testing temperature, and had values between those for reactions (1) and (2), consistent with the proposed reaction scheme. Thus the OCV increased as expected when 60% CO was present in the feed gas when compared to use of $H_2$ alone.

Example 6

Cell Performance

Table 3 compares performances of fuel cells having $LaCrO_3$—$VO_x$—YSZ anode catalysts with compositions comprising by weight ratio: 80:0:20, 40:40:20, 20:60:20, 0:60:40, 0:80:20. As can be seen, omitting either one of $VO_x$ (80:0:20) or $LaCrO_3$ (0:60:40, 0:80:20) gave a catalyst with inferior performance when compared to catalysts comprising all three components. The catalyst having about equal amounts by weight of $LaCrO_3$ and $VO_x$ gave superior performance than one poorer in $LaCrO_3$. Further, increasing the content of YSZ relative to $VO_x$ diminished performance when the catalyst contained no $LaCrO_3$ (0:60:40<0:80:20), showing that $VO_x$ was an active catalyst.

Figure 7:
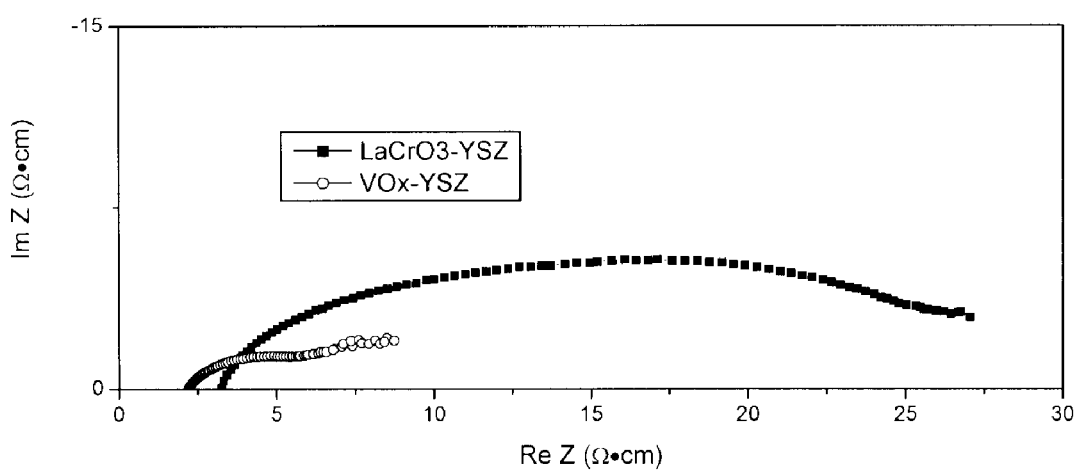
FIG. 7 shows impedance spectra for $LaCrO_3$—YSZ and $VO_X$—YSZ catalysts, each in weight ratio 80:20, in $H_2S$-containing syngas at 900° C.
Figure 8:
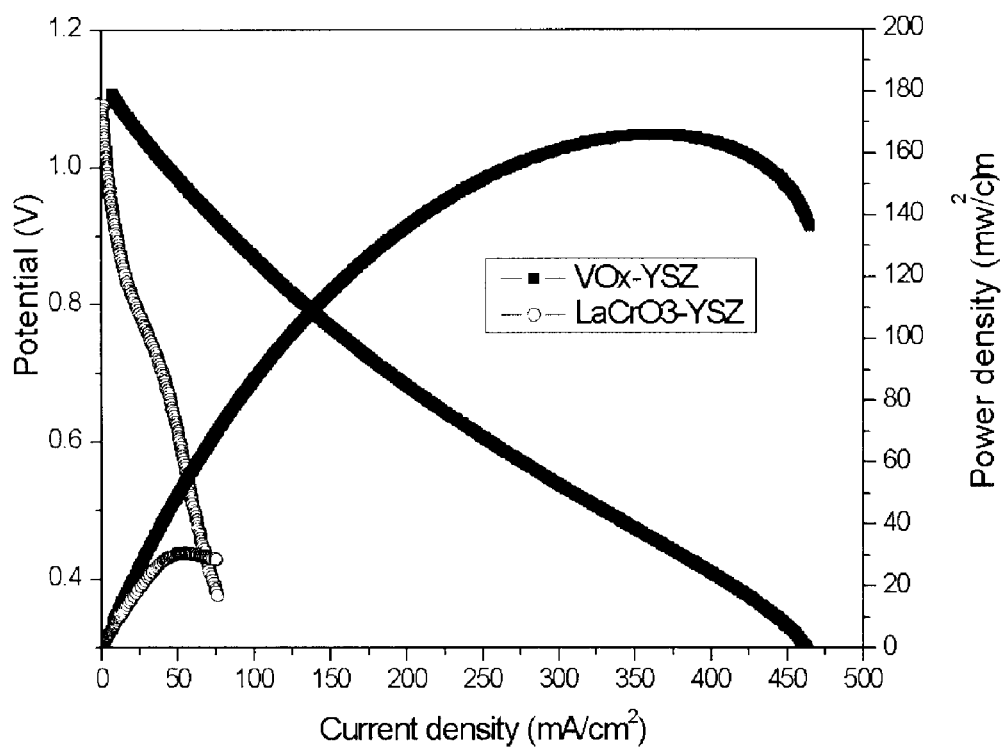
FIG. 8 shows IV-IP performances for $LaCrO_3$—YSZ and $VO_X$—YSZ catalysts, each in weight ratio 80:20, in $H_2S$-containing syngas at 900° C.

FIGS. 7 and 8 respectively show the impedance spectra and performances of $LaCrO_3$—YSZ and $VO_x$—YSZ catalysts with compositions having the same weight ratios 80:20 in the $H_2S$-containing syngas (i.e., $LaCrO_3$—$VO_x$—YSZ composition of: 80:0:20, 0:80:20).

FIG. 7 shows that the polar resistance of the anode catalyst containing $LaCrO_3$ is much higher than that containing the same weight amount of $VO_x$. The ohmic resistances of these two catalysts are close in value. FIG. 8 shows that the fuel cell performance of the $VO_x$ containing catalyst is much better than that of the $LaCrO_3$ containing catalyst. For commercial $LaCrO_3$, the maximum power density is only about 25 $mW/cm^2$. In contrast, the maximum power density is over 160 $mW/cm^2$ for $VO_x$. These data illustrate that the $VO_x$ component is a highly active anode catalyst, and that $LaCrO_3$ is a weaker catalyst.

Figure 9:
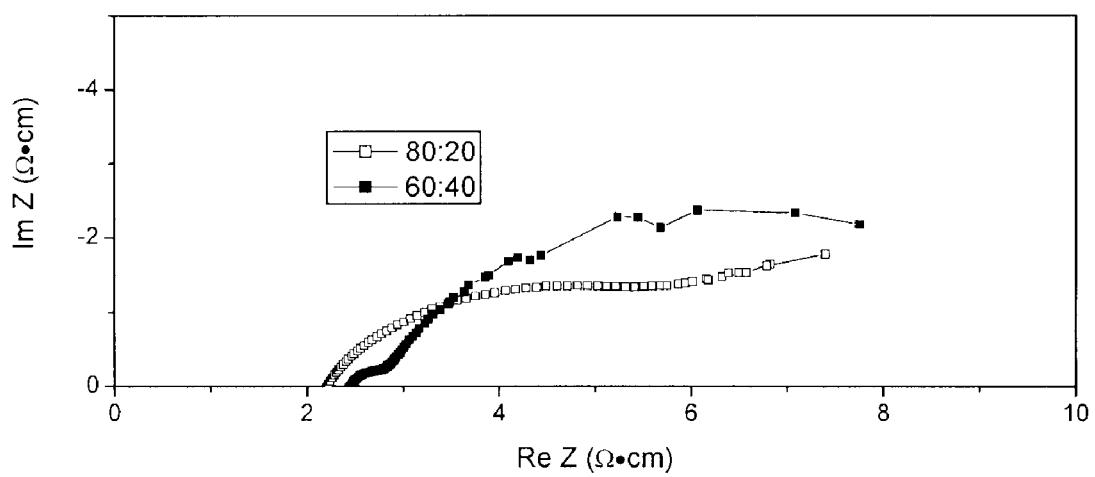
FIG. 9 compares impedance spectra of VOx-YSZ in weight ratios 80:20 and 60:40 in $H_2S$-containing syngas at 900° C.

FIG. 9 compares impedance spectra of $VO_x$—YSZ anode catalysts having the compositions: 60:40, 80:20, and FIG. 4 compares performance of fuel cells using these catalysts. When the proportion of $VO_x$ in the catalysts decreases, the performance drops from over 160 $mW/cm^2$ to about 100 $mW/cm^2$.

Figure 10:
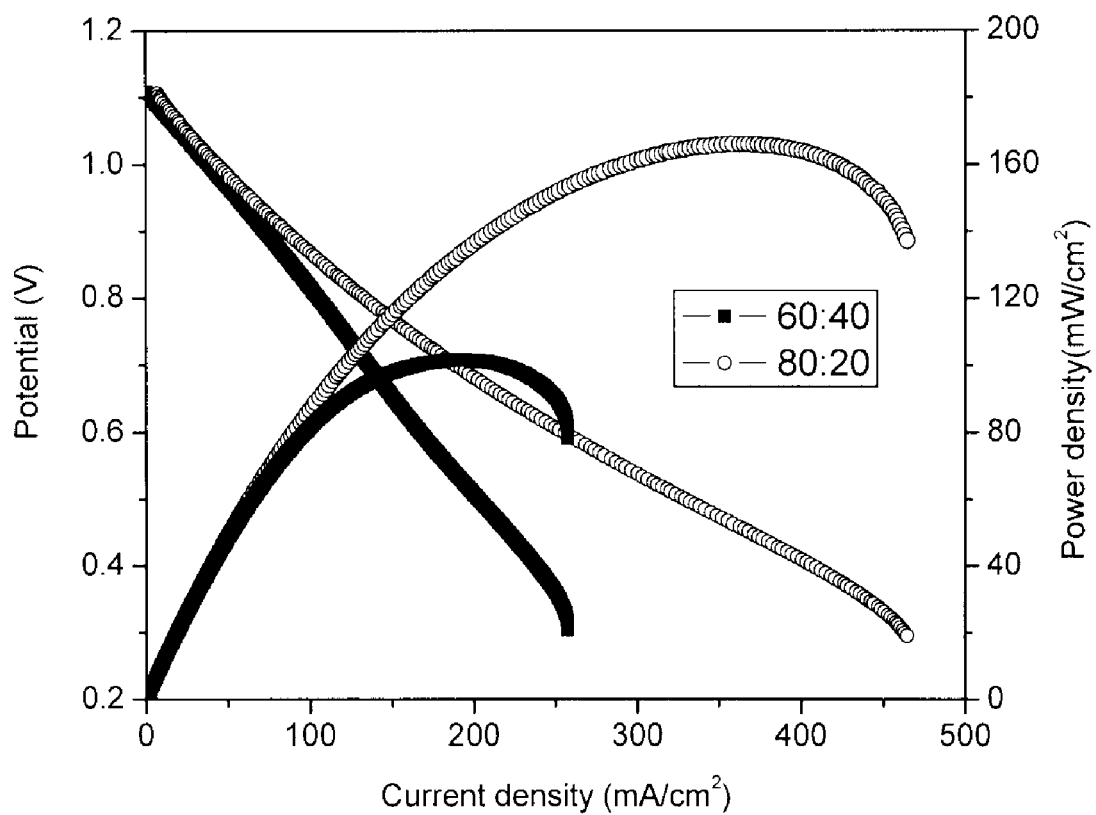
FIG. 10 compares IV-IP performances of fuel cells having anode catalysts comprising $VO_X$—YSZ, in weight ratios 80:20 and 60:40 in $H_2S$-containing syngas at 900° C.
Figure 11:
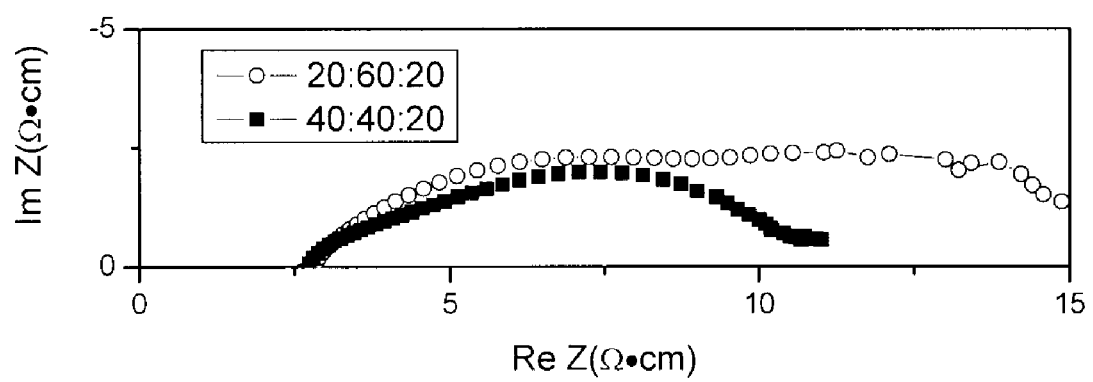
FIG. 11 compares impedance spectra of catalysts comprising different weight ratios of $LaCrO_3$—$VO_X$—YSZ at 900° C.
Figure 12:
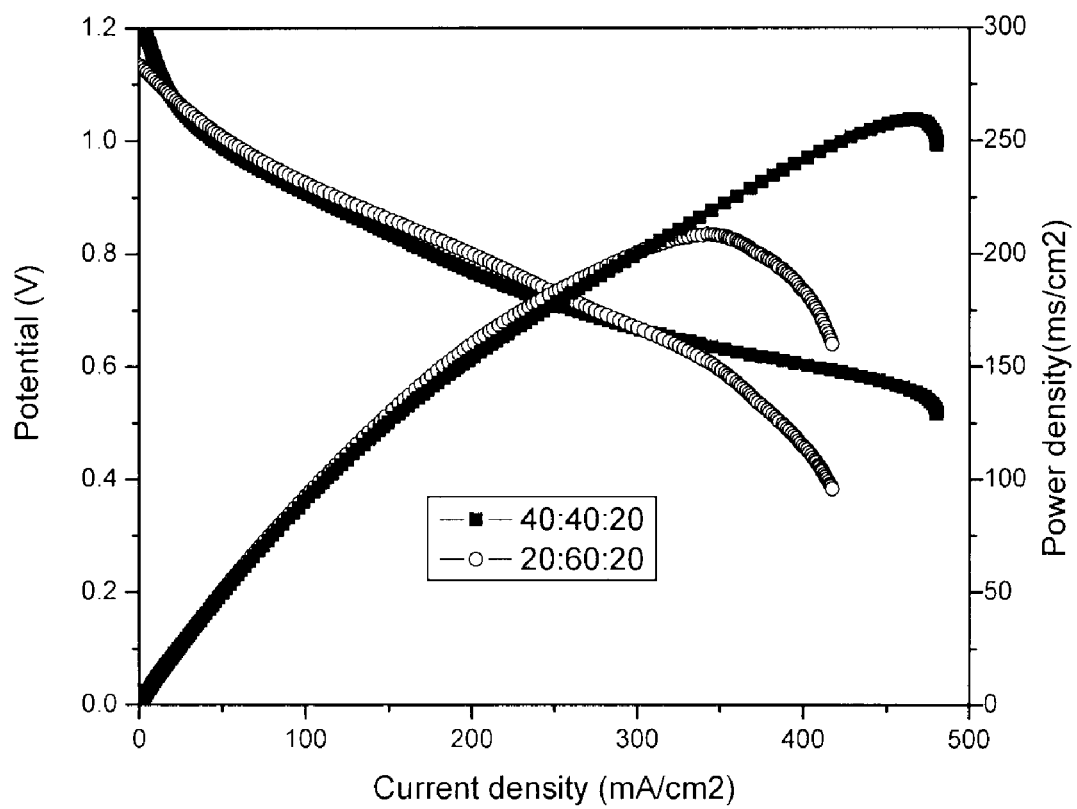
FIG. 12 compares IV-IP performances of fuel cells having anode catalysts comprising $LaCrO_3$—$VO_X$—YSZ with different ratios at 900° C.

FIGS. 10 and 11 respectively compare impedance spectra and performances of anode catalysts comprising $LaCrO_3$, $VO_x$ and YSZ in weight ratios: 40:40:20 and 20:60:20. These are preferred catalysts among the present series, the performances of which are much higher than those of the other compositions presented in Table 3. While not wishing to be limited by theory, the improved performance when compared to catalysts containing no $LaCrO_3$ may arise from a promoter effect of $LaCrO_3$ on the $VO_x$ catalyst, for example by increasing at least one of either the number or activity of $VO_x$ adsorption sites for one or more fuel gas components. $VO_x$ itself has fewer adsorption sites on its surface. The ohmic resistances are very close for these two compositions. This is attributable at least in part to the good electronic conduction of $VO_x$ in the reducing environment. Although the amount of $LaCrO_3$ is reduced in the composition having ratio of 20:60:20, the ohmic resistance does not increase. However, the polar resistance increases significantly when the proportion of $LaCrO_3$ is reduced. The data from the performance tests are consistent with the impedance spectra. In FIG. 12, the performance of 40:40:20 ratio catalyst is higher than that with ratio 20:60:20. Thus the performance is not improved by only increasing the catalytic sites while decreasing the adsorption sites.

Figure 13:
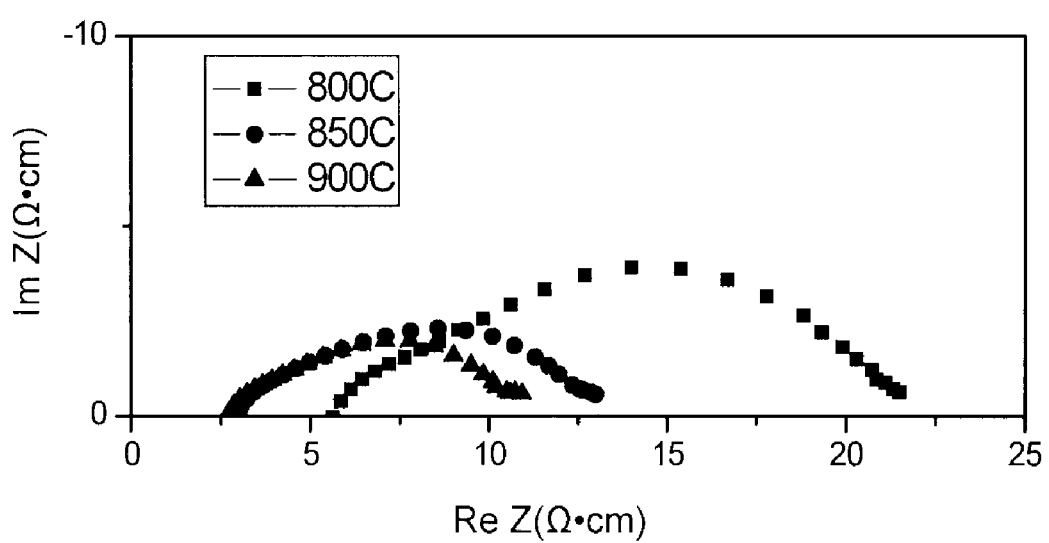
FIG. 13 shows impedance spectra of $LaCrO_3$—$VO_X$—YSZ in $H_2S$-containing syngas at 800° C., 850° C. and 900° C.

FIG. 13 shows impedance measurements using $LaCrO_3$—$VO_x$—YSZ anodes in $H_2S$-containing syngas at different temperatures. The polarization decreased with increasing temperature, and the smallest polarization radius was obtained at 900° C. Ohmic resistance decreased as the temperature increased for two reasons: the conductivity of YSZ membrane increased with temperature, and the contribution from conductivity of $LaCrO_3$ also increased, as it is a semiconductor at high temperatures. However, the increase in conductivity with temperature was less significant at temperatures over 850° C., and the ohmic resistances were close to 2.5Ω at both 850° C. and 900° C. GC analyses showed that both products of reactions (1) and (2), $H_2O$ and $CO_2$ respectively, were present in the effluent gases. Therefore there should be at least two semicircles in the spectra, arising from reactions (1) and (2) when these two reactions occur simultaneously and independently on the anode catalysts surface. However, in the spectra obtained one of the semicircles predominated, and so it was difficult to deconvolute the two semicircles (FIG. 13).

Figure 14:
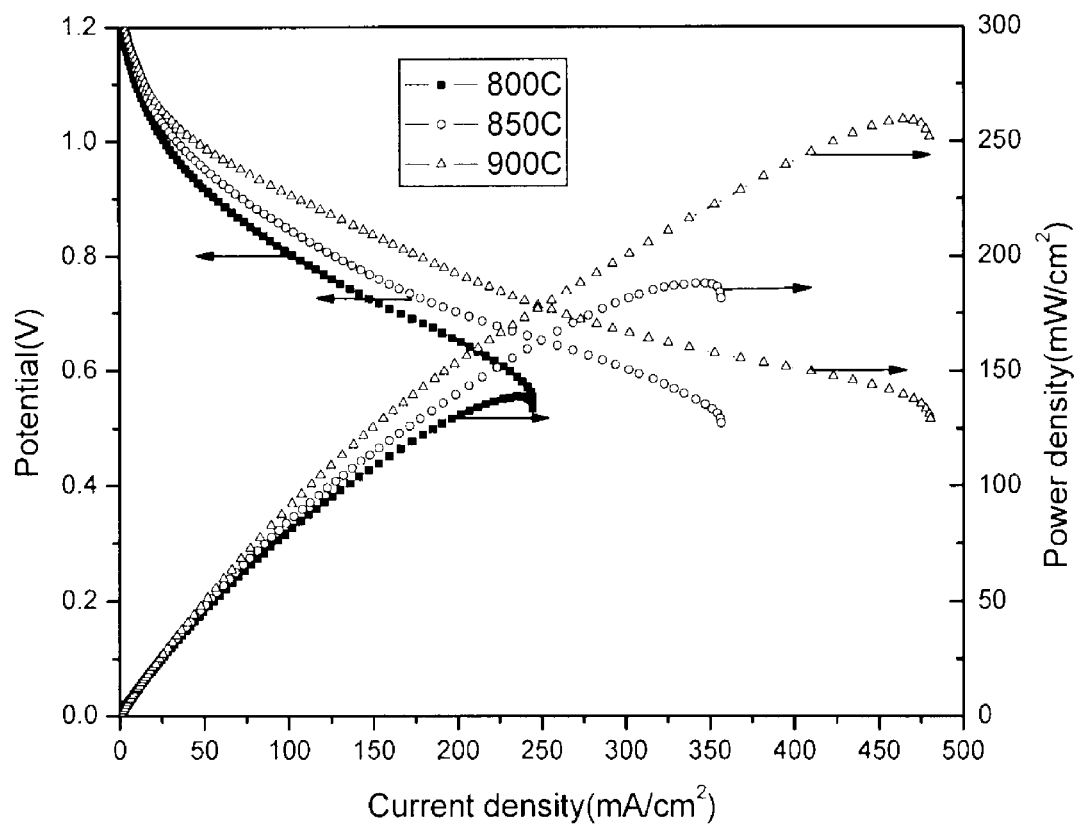
FIG. 14 shows IV-IP performances of $LaCrO_3$—$VO_X$—YSZ in $H_2S$-containing syngas at 800° C., 850° C. and 900° C.

FIG. 14 shows that cell performance improved at higher temperature, consistent with the data from impedance spectra, in which the polarization radius shortened with increasing temperature. The maximum power density was 145 $mW/cm^2$ and 190 $mW/cm^2$, respectively, at 800° C. and 850° C. when using impure syngas as the feed. At 900° C., the maximum power density rose to over 260 $mW/cm^2$ at a current density close to 450 $mA/cm^2$ and a potential of 0.6 V. The maximum values for power density were attained around 0.6V at each temperature and corresponding current density, and was located at the transition area between the zones in which performance is subject to ohmic loss and concentration loss.

Fuel cell performance curves are divisible into three zones in which operation of the fuel cell is subject to activation loss, ohmic loss and concentration loss. Each zone has different electrochemical principles. In concentration loss, the impact of mass transfer limitations increases with polarization. Thus, although current density continues to increase, the rate of increase rapidly reduces. For the present system, the power density curves peaked and then fell after entering the concentration loss zone.

Example 7

Enhancement to cell performance in the presence of CO

Figure 15:
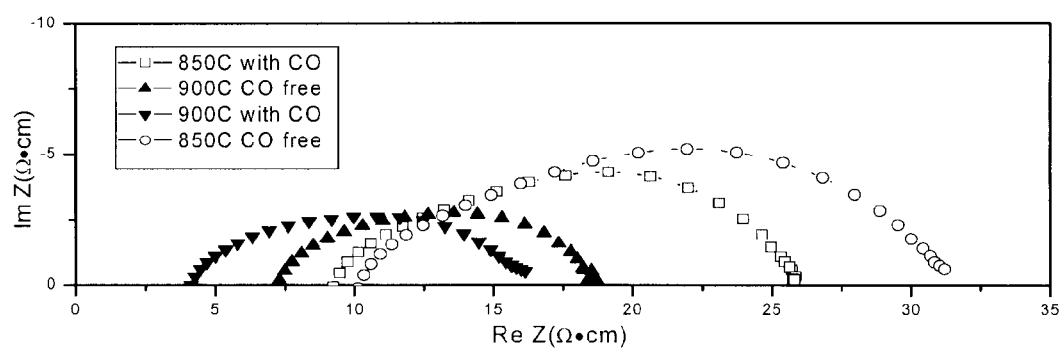
FIG. 15 shows impedance spectra for $LaCrO_3$—$VO_X$—YSZ in syngas and $H_2$ feeds, each containing 5000 ppm $H_2S$.
Figure 16:
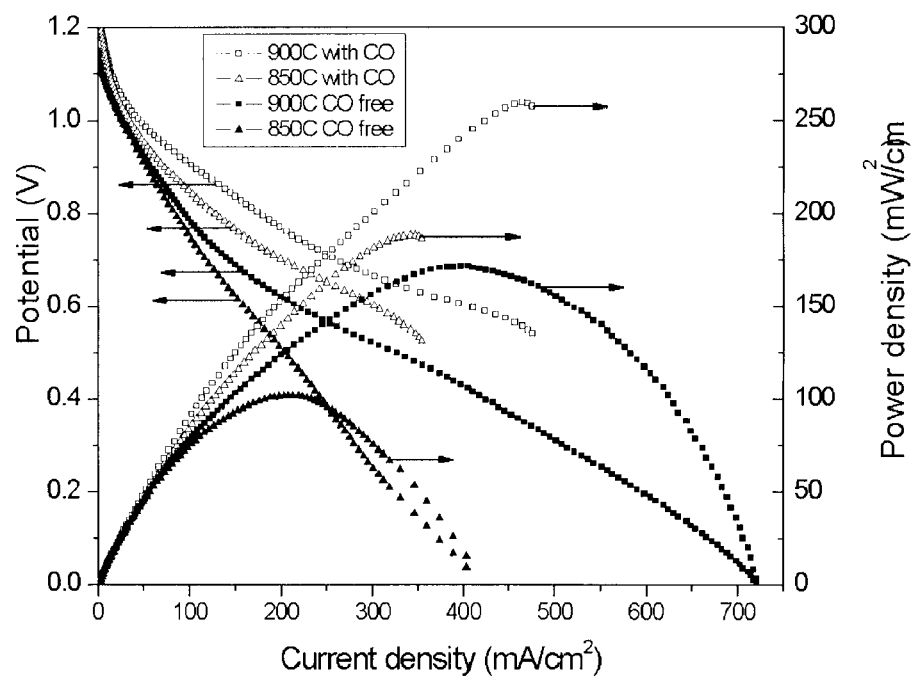
FIG. 16 shows IV-IP performances for $LaCrO_3$—$VO_x$—YSZ in syngas and $H_2$ feeds.

FIGS. 15 and 16 show fuel cell impedances and performance measurements, respectively, using $LaCrO_3$—$VO_x$—YSZ catalysts in $H_2S$-containing $H_2$ and $H_2S$-containing syngas in the presence or absence of CO. The presence of CO in $H_2S$-containing syngas caused significant differences in both impedance and performance when compared with $H_2S$-containing $H_2$. The ohmic resistance decreased at each testing temperature when CO was present. While not wishing to be limited by theory, this may be due to the ability of CO to displace chemisorped $H_2O$ from catalytic sites, thus promoting the rate of reaction and mass transfer of $H_2O$ product. Insufficient time had elapsed to allow any level of carbon deposition significant enough to affect electronic conductivity. The ohmic resistance decreased with increase in temperature in a similar manner when using either syngas or $H_2$ feed, and so the conductivities of both YSZ pellet and $LaCrO_3$ component of the anode catalyst were unaffected. The spectra showed that polarization was smaller and the radius shortened when CO was present in the feed gas, and that higher temperature resulted in a smaller radius for each feed.

Fuel cell performance was also better when CO was present in the feed gas at each temperature (FIG. 16). At 900° C. the maximum power density was 170 mW/cm² in $H_2$, compared to 260 mW/cm² when syngas was the feed, and at 850° C. the maximum power density using $H_2$ was 100 mW/cm² compared to 200 mW/cm² using syngas. Also, the potentials at which the maximum power density was obtained using syngas were higher than those when $H_2$ was the feed. The potential at which power density was a maximum was about 0.6 V for each temperature when using $H_2S$-containing syngas as feed. However, when using $H_2S$-containing $H_2$ (which was CO free), the potentials were around 0.4 V at maximum power density. In either gas environment, the potentials at which maximum power density was obtained were very similar for each testing temperature.

GC analysis showed that $CO_2$ and $H_2O$ were both present in the effluent, and so both reactions (1) and (2) were occurring.

Example 8

Stability of $LaCrO_3$—$VO_x$—YSZ

Figure 17:
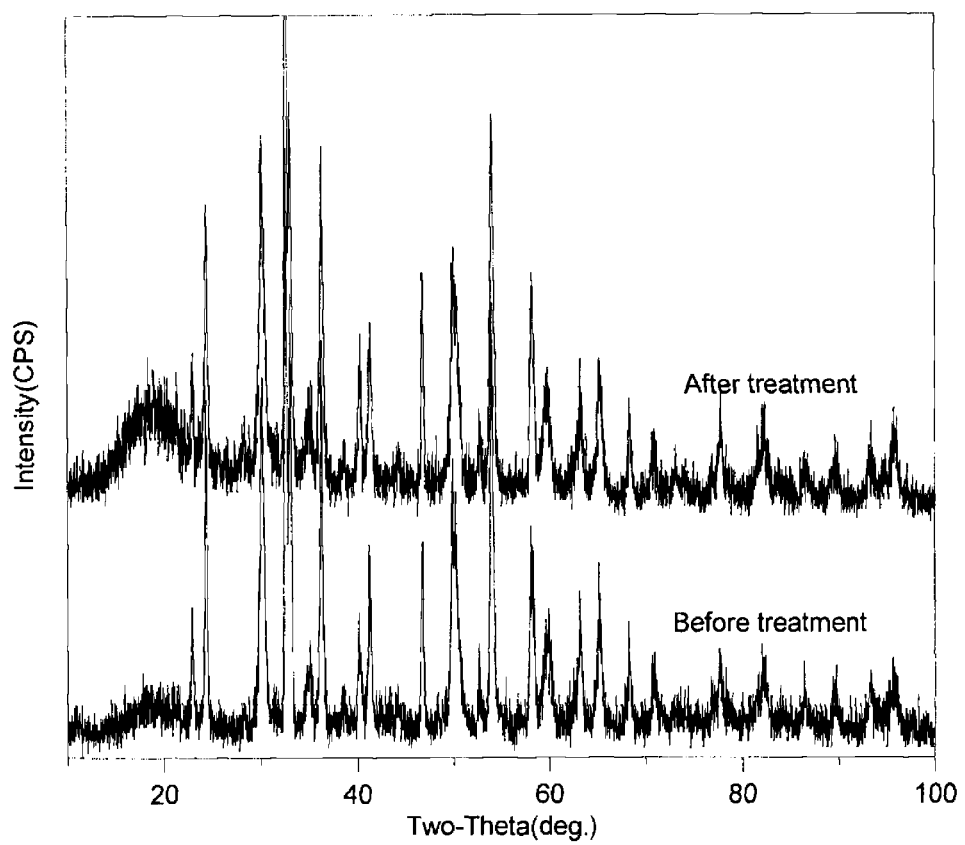
FIG. 17 shows XRD patterns of the catalysts before and after baking in $H_2S$-containing syngas.

The anode catalysts in solid oxide fuel cells are required to be both chemically and electrochemically stable. To test the chemical stability of $LaCrO_3$—$VO_x$—YSZ, a sample was baked in $H_2S$-containing syngas (40% $H_2$, 60% CO containing 5000 ppm $H_2S$) at 900° C. for 24 hours, then analyzed using XRD. FIG. 17 compares the XRD pattern of the catalyst after baking with that of a fresh sample. The main peaks of the catalysts did not change after being baked in the environment for 24 hours. Thus each of the components of the composite catalyst was independently chemically stable in this reducing environment.

Figure 18:
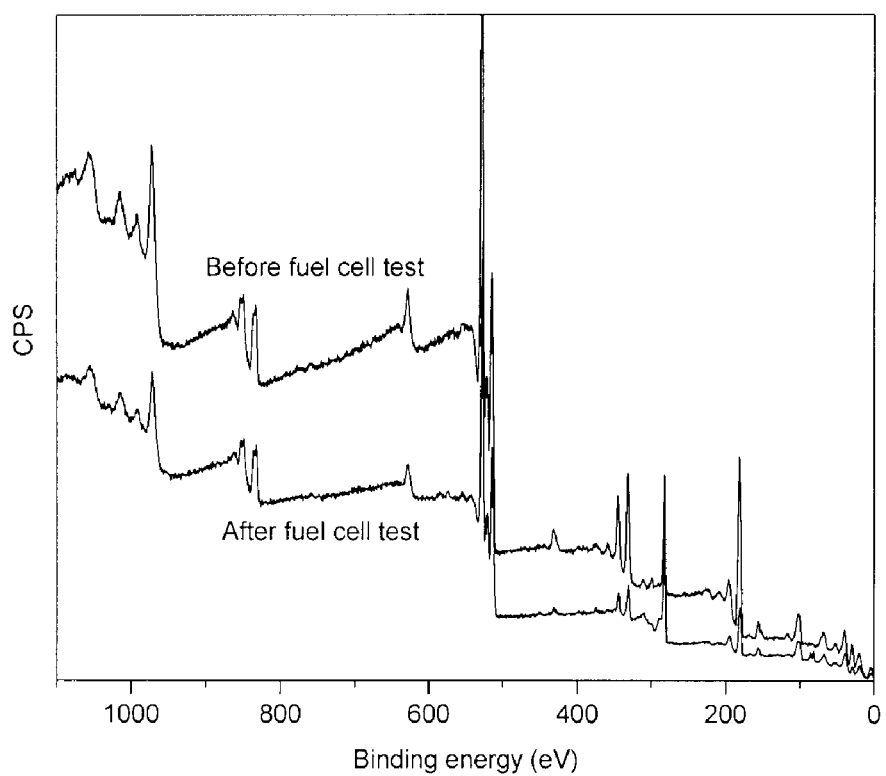
FIG. 18 shows comparison of binding energies of fresh and treated catalysts (full range)
Figure 19:
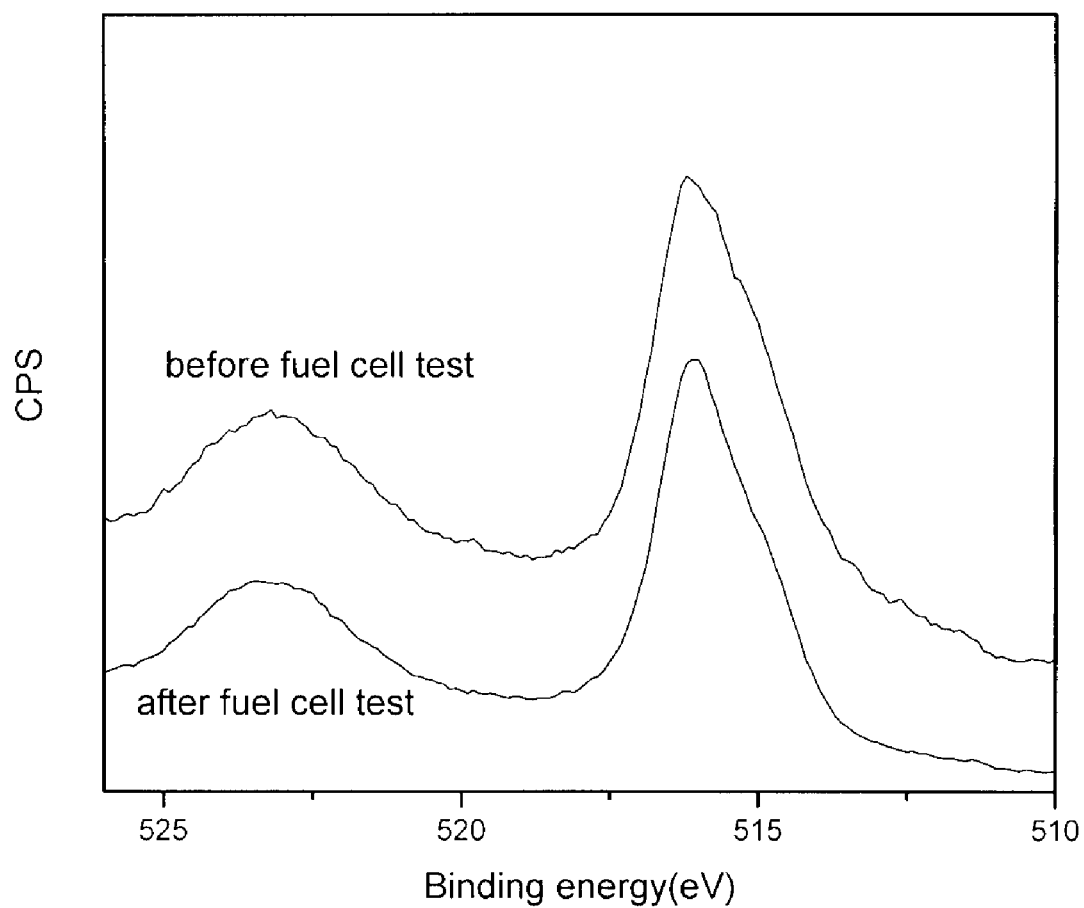
FIG. 19 shows comparison of binding energy of V2p before and after fuel cell tests.

XPS analysis was used to test the electrochemically stability of the $LaCrO_3$—$VO_x$—YSZ catalysts. After operation of the fuel cell using $H_2S$-containing syngas for 24 hours, the catalyst-electrolyte assembly was carefully detached from the fuel cell. The anode surface was analyzed using XPS and compared with a fresh sample. FIG. 18 shows the full range of binding energies. FIG. 19 shows the binding energy of 2p electrons of vanadium oxide. The binding energy of each element in the catalysts remained unchanged, and so the oxide was stable during fuel cell operation. $VO_x$ was not further reduced to elemental vanadium.

Figure 20:
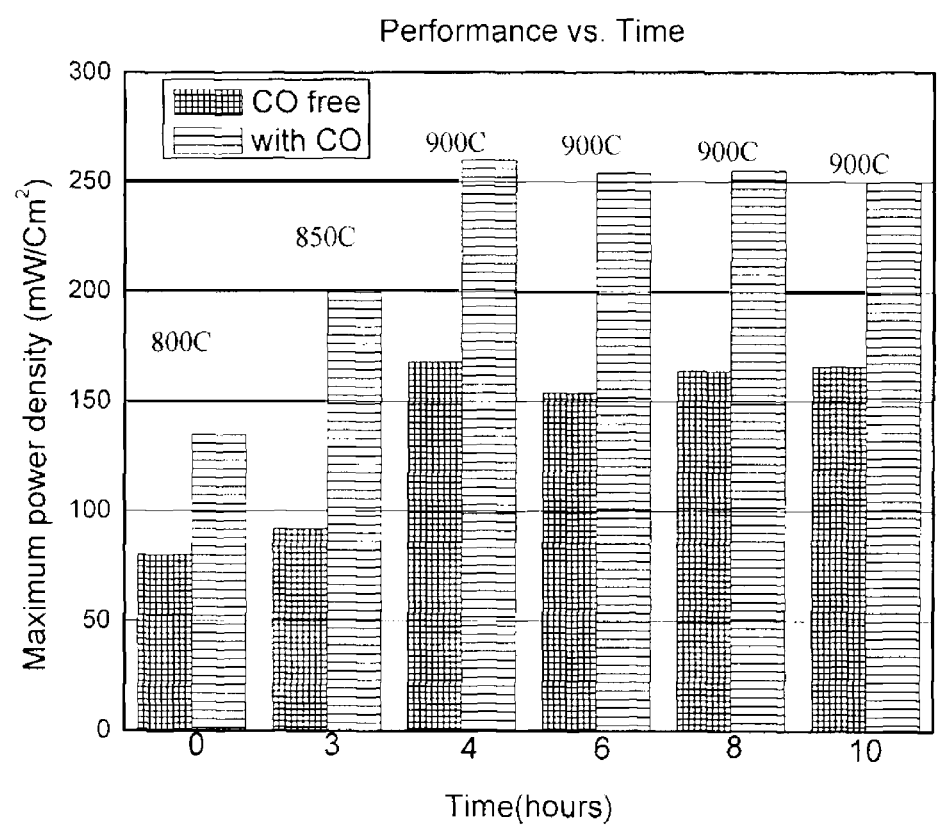
FIG. 20 shows maximum power densities as a function of temperature and time.

FIG. 20 shows the maximum power density as a function of temperature and time of the solid oxide fuel cell with $LaCrO_3$—$VO_x$—YSZ as anode catalysts using both impure syngas and $H_2$. The initial performance data were obtained at 800° C., and the cell was then heated incrementally to 850° C. and then 900° C. (4 hours), at which temperature it was operated for a further 6 hours. In both $H_2S$-containing $H_2$ and $H_2S$-containing syngas the maximum power density rose with temperature, and there was only a small change in performance over the next 6 hours operation at 900° C.

Figure 21:
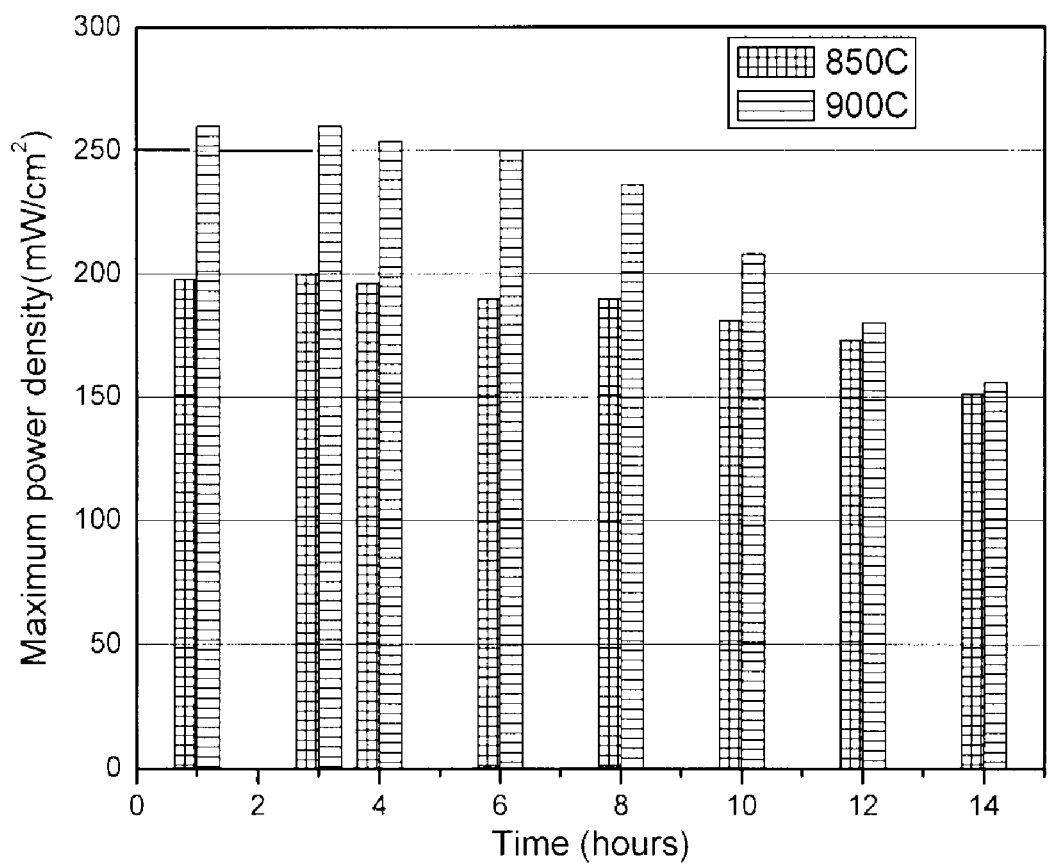
FIG. 21 shows the effect of carbon deposition on performance at different temperatures.

FIG. 21 shows the maximum power density at different temperatures during extended tests. It was found that carbon deposition slowly compromised fuel cell performance when the fuel cell was run for longer periods at high temperature in the presence of CO (FIG. 21). Possible causes of carbon deposition include reduction of CO (Reaction 10) and the Boudouard reaction (Reaction 11), both of which are reversible.

$$CO + H_2 \rightarrow C + H_2O \tag{10}$$

$$2CO \rightarrow CO_2 + C \tag{11}$$

Figure 22:
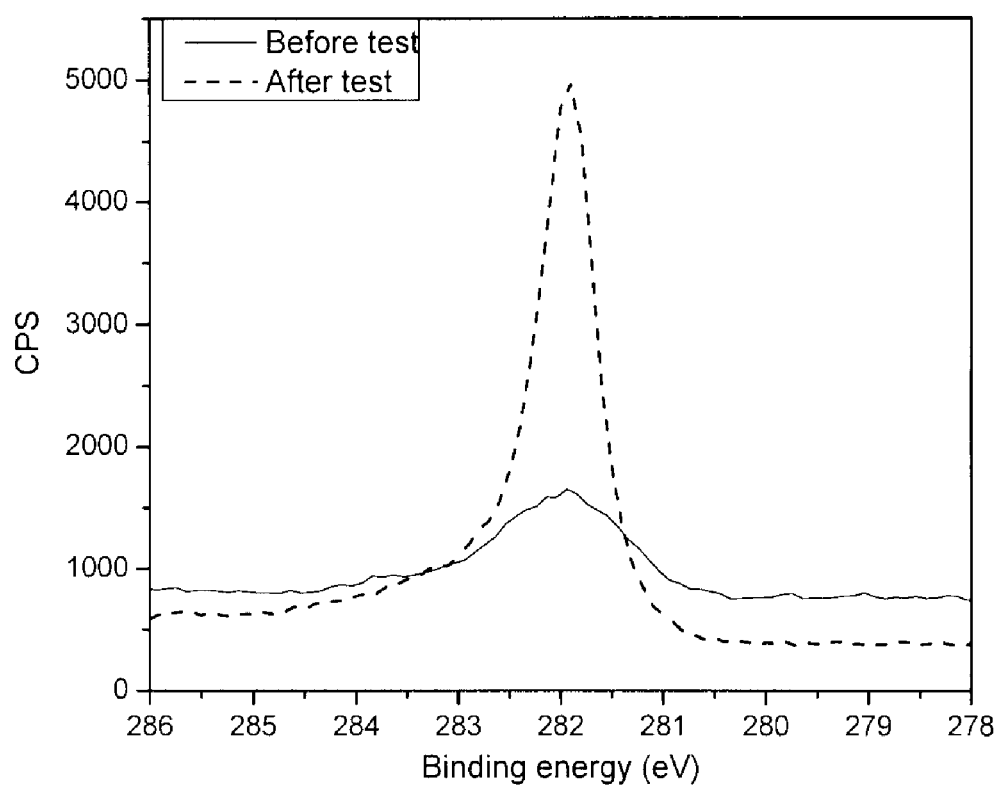
FIG. 22 shows binding energy peak comparisons of C1s before and after 24 hour fuel cell tests.

In these reactions, CO is reduced to carbon and so fuel cell performance decreases when active sites on the catalyst are occupied by carbon. Although both reactions are thermodynamically less favourable for carbon formation at higher temperatures, the rate of reaction increases with temperature. Thus higher temperatures favor more rapid formation of carbon deposits. FIG. 21 shows that the maximum power density decreased more quickly at 900° C. than at 850° C., and this was attributable to more rapid development of carbon deposits. Over the first 6-8 hours there were only small changes in power density. However, performance started to decrease more rapidly after 10 hours operation. XPS analysis of carbon 1s electrons on the anode surface of a sample operated under fuel cell conditions for 24 hours were compared with a fresh sample (FIG. 22). The concentration of carbon deposited on the anode surfaces increased dramatically.

Figure 23:
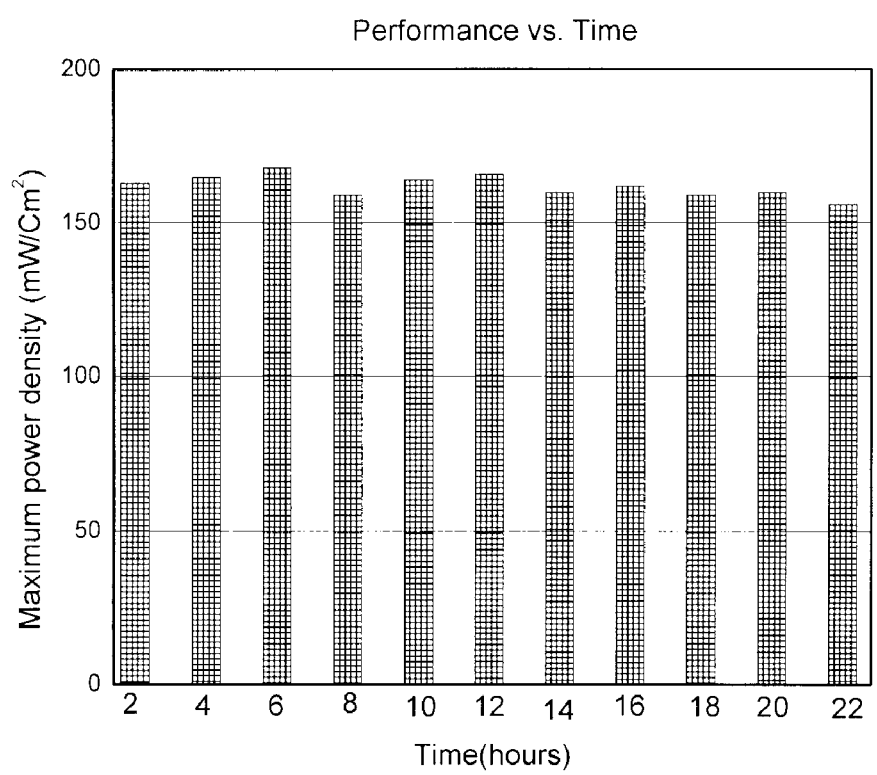
FIG. 23 shows performance as a function of time in $H_2$+5000 ppmv $H_2S$ at 900° C.

Comparison of performance using syngas and $H_2$ feeds, balanced with 5000 ppm $H_2S$, showed that CO was the source of carbon deposits. Fuel cell performance was stable at 900° C. when $H_2S$-containing $H_2$ was the feed gas (FIG. 23).

Example 9

Effect of Promoters on Fuel Cell Performance

To illustrate the use of promoters to enhance anode catalyst performance, the use of doped $La_{0.7}Sr_{0.3}CrO_3$—$VO_x$—YSZ catalysts is described with reference to FIGS. 24 through 26.

Figure 24:
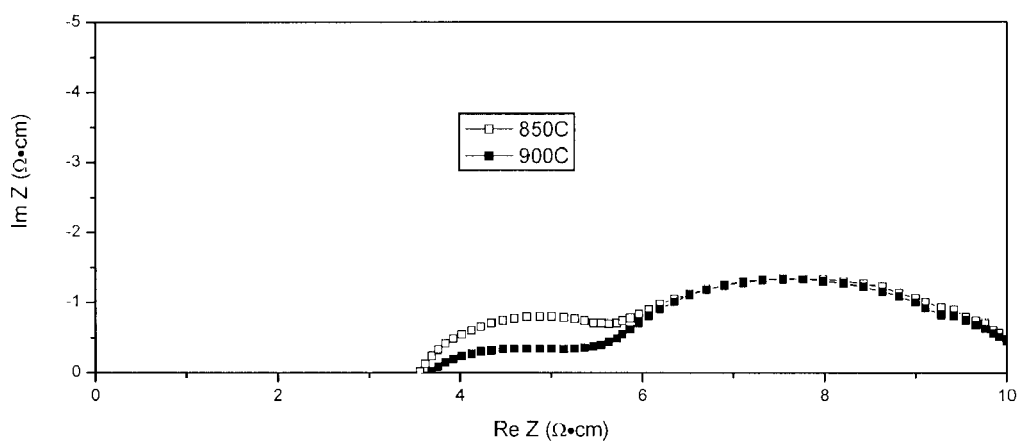
FIG. 24 shows impedance spectra of $La_{0.7}Sr_{0.3}CrO_{2.85}$—$VO_x$—YSZ in $H_2S$-containing syngas at 850° C. and 900° C.
Figure 25:
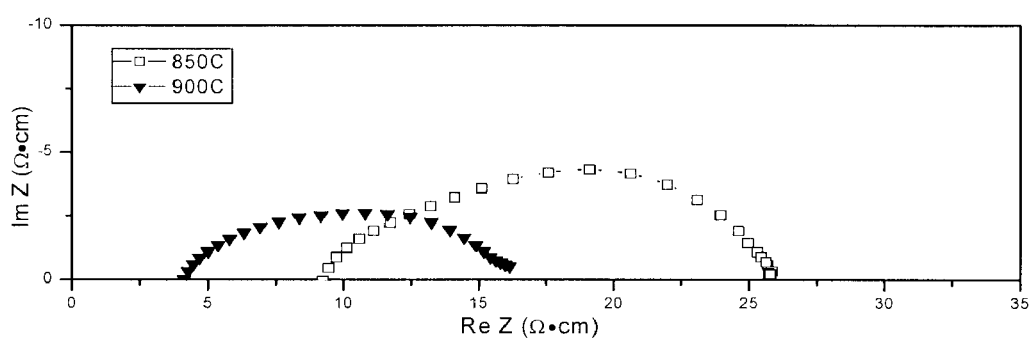
FIG. 25 shows impedance spectra for $LaCrO_3$—$VO_x$—YSZ in $H_2S$-containing syngas at 850° C. and 900° C.

FIG. 24 shows the impedance measurements using $La_{0.7}Sr_{0.3}CrO_{2.85}$—$VO_x$—YSZ as anode in $H_2S$-containing syngas at 850° C. and 900° C. There were two distinct semicircles in the curve at each temperature. At 900° C., the ohmic resistance was slightly lower than that at 850° C., attributed to the higher conductivity of these anode and electrolyte oxide materials at the higher temperature. The radius of the first semicircle was smaller at 900° C. However, the radius of second semicircle was very similar at each temperature, showing that the electrochemical process corresponding to the first semicircle was more sensitive to temperature than the other. In contrast, for undoped $LaCrO_3$—VOx-YSZ catalysts (FIG. 25) the two semicircles were less well distinguished from each other. Further, for undoped catalyst the total polarization resistance was much lower and was considerably reduced at 900° C. when compared with that at 850° C. At 900° C., the doped catalyst had similar ohmic resistance to the undoped catalyst. The difference between ohmic resistances of the doped catalyst at the two temperatures was very small when compared with the large difference found for undoped catalyst.

Figure 26:
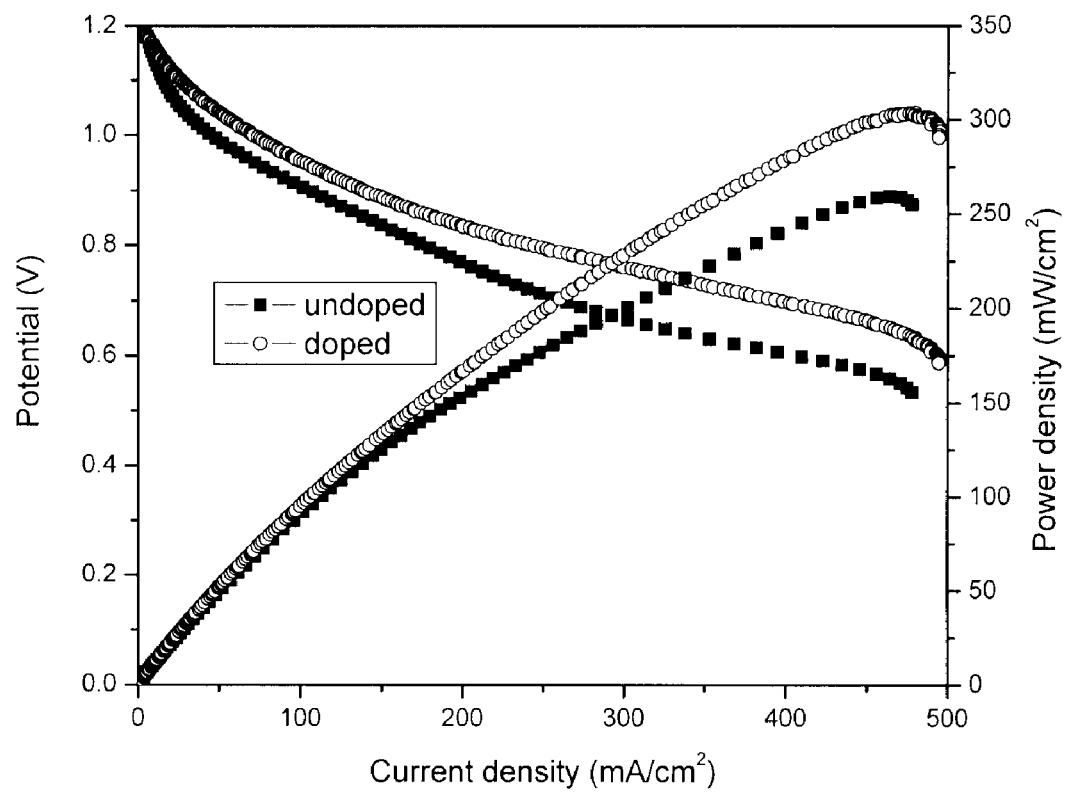
FIG. 26 shows IV-IP curves comparing performances of fuel cells using doped ($La_{0.7}Sr_{0.3}CrO_{2.85}$—$VO_x$—YSZ) and undoped ($LaCrO_3$—$VO_x$—YSZ) catalysts in fuel cells operated using $H_2S$-containing syngas.

The performance of fuel cells using the strontium-doped catalyst is compared with that of fuel cells using the undoped catalyst in FIG. 26 by comparing I-V and I-P curves obtained at 900° C. The catalytic activity of $La_{0.7}Sr_{0.3}CrO_{2.85}$—YSZ was better than that of $LaCrO_3$—$VO_x$—YSZ. The maximum power density obtained with the doped catalysts was over 300 mW/cm² at 900° C., compared with ca. 270 mW/cm² for undoped catalyst. The current densities for each value were similar, and the potential at which the maximum power density was obtained for the doped catalyst was higher than that of the undoped catalysts.

While not wishing to be limited by theory, the superior performance of $La_{0.7}Sr_{0.3}CrO_{2.85}$—$VO_x$—YSZ composite catalyst compared to $LaCrO_3$—$VO_x$—YSZ composite catalyst is at least partially attributable to the reduced ohmic losses when using the doped catalyst (FIG. 24 c.f. FIG. 25).

Initial performance of $La_{0.7}M_{0.3}CrO_{2.85}$ (M is Mg or Co) was poor compared to the corresponding perovskite where M is Sr, described above. Further, the anode delaminated from the electrolyte due to mismatch of the thermal expansion coefficients. Consequently, an interfacing layer is required between the electrolyte and anode catalysts comprising perovskites where M is Mg or Co.

Example 10

Effect of Doping Anode Catalysts with $K_2O$ on Carbon Deposition

Catalysts doped with potassium were prepared by impregnation of dry $LaCrO_3$—$VO_x$—YSZ with aqueous solutions of KOH. The impregnation was performed overnight in small containers to obtain a homogeneous distribution of potassium throughout the particles before drying at room temperature. Then the samples were calcined under a stream of dry $H_2$ at 500° C. for 4 hours in a tubular electrical furnace, to form potassium oxide on the catalyst surface (0.05%, 0.1% and 1% $K_2O$ by weight). The samples were kept under inert gas in sealed containers to avoid contact with either water vapor or $CO_2$ from air.

Figure 27:
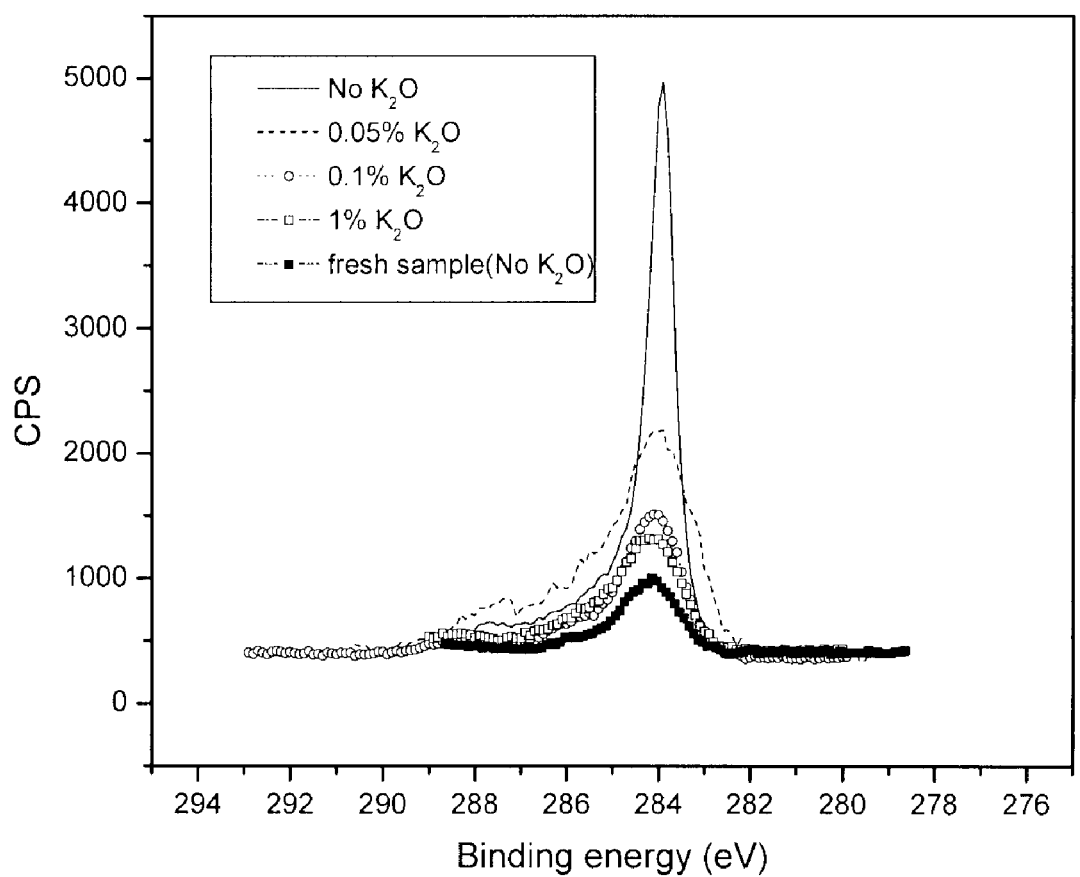
FIG. 27 compares intensities of peaks for carbon 1s binding energy obtained by XPS after use of anode catalysts with different amounts of potassium dopant.

FIG. 27 compares amounts of carbon deposition after 24 hour fuel cell tests using syngas for the anode catalysts having different levels of $K_2O$ dopant. The XPS analyses of binding energy showed that the catalysts having higher $K_2O$ concentration had less carbon deposition. The catalyst with 1% $K_2O$ had very little carbon deposited on the surface, the amount of carbon being only slightly higher than that on the fresh sample. In contrast, the carbon deposited on the catalyst without $K_2O$ increased dramatically during fuel cell tests.

Example 11

Humidification of the Anode Feed to the Fuel Cell to Suppress Coking

Figure 28:
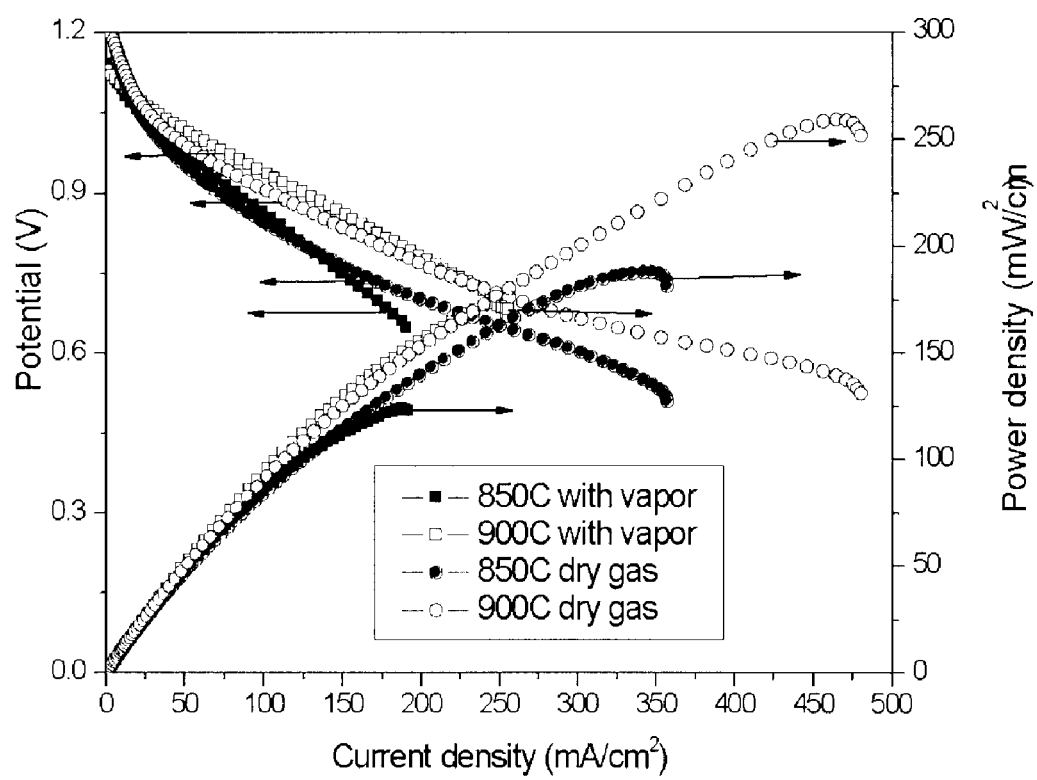
FIG. 28 compares fuel cell performance using humidified and dry anode feeds.

The rates of carbon deposition on the anode catalyst ($LaCrO_3$—$VO_x$—YSZ) were determined under dry and humidified conditions. A bubbler held at room temperature was used to humidify the anode feed to about 3% before feeding the fuel stream via the anode inlet gas tube. FIG. 28 compares fuel cell performance for humidified and dry feeds, after the fuel cells were stabilized at different temperatures. The fuel cell using dry feed had better initial discharging performance compared to that using of humidified fuel at each temperature. At 900° C., the maximum power density in dry syngas was 260 mW/cm² at about 0.6 V and the current density was over 450 mA/cm². The performance of the cell using humidified anode feed was about 170 mW/cm² at 900° C., also obtained at about 0.6 V with a corresponding current density of 250 mA/cm². Fuel cell performances increased with temperature for both dry and humidified fuels. In dry syngas, the fuel cell power density increased from 180 mW/cm² to 260 mW/cm² when the operating temperature increased from 850° C. to 900° C. Using the humidified syngas fuel, the power density increased from about 120 mW/cm² to 170 mW/cm² when the temperature increased from 850° C. to 900° C.

In the single button fuel cell, the concentrations of fuel conversion products were low even at high polarized states. When using dry gases, the concentration of water vapor was smaller than the saturated vapor pressure at room temperature, i.e., <<3%. The admixing of the 3% vapor in the humidified fuel decreased fuel cell performance at each testing temperature. While not wishing to be limited by theory, one possible reason was adsorption of $H_2O$ molecules on the anode surface. It is anticipated that, when the water vapor pressure increased in the feed gas, more $H_2O$ was adsorbed onto the anode catalyst and blocked some active sites, thus leading to the performance drop.

Figure 29:
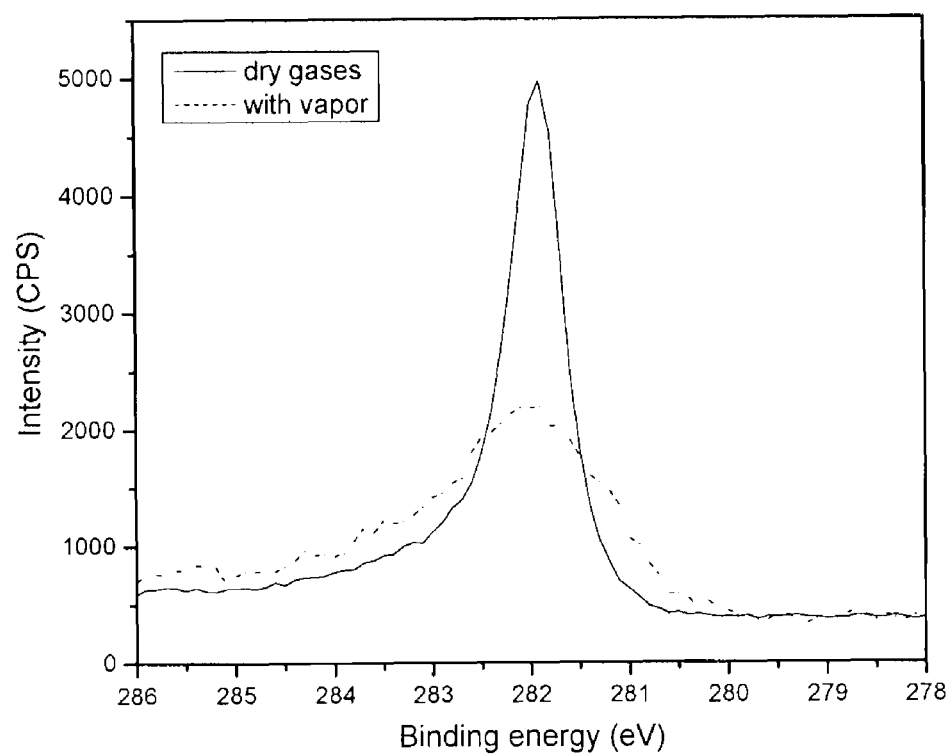
FIG. 29 compares the carbon signal intensity for anode catalysts used with humidified and dry anode feeds.

After fuel cell operation in the respective gas environments for 24 hours, the electrode-electrolyte assembly was carefully detached from the cell for carbon deposition testing. FIG. 29 compares the carbon deposited during operation in the humidified and dry gases. The carbon deposition amount decreased when about 3% vapor was mixed into the feed gas. This was because the equilibrium of coking was shifted by the vapor admixing. There still was some carbon deposition on the catalysts surface when using the humidified feed, although the amount was significantly lower than when the feed was not humidified.

While the present invention has been described with reference to what are presently considered to be the preferred examples, it is to be understood that the invention is not limited to the disclosed examples. To the contrary, the invention is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

TABLE 1

Measured OCV at different test temperature and gas feed.

| | 5000 ppm $H_2S$, balance $H_2$ | 5000 ppm $H_2S$, balance 40% $H_2$, 60% CO |
|---|---|---|
| T = 800° C. | 1.099 | 1.233 |
| T = 850° C. | 1.070 | 1.227 |
| T = 900° C. | 1.064 | 1.222 |

TABLE 2

Calculated E° and E(T) for reaction (1) and (2).

| | Reaction (1) | | Reaction (2) | |
|---|---|---|---|---|
| | E°(T) | E(T) | E°(T) | E(T) |
| T = 800° C. | 0.9767 | 1.1025 | 0.9794 | 1.2710 |
| T = 850° C. | 0.9624 | 1.0940 | 0.9570 | 1.2622 |
| T = 900° C. | 0.9479 | 1.0854 | 0.9346 | 1.2534 |

TABLE 3

Performance of cells having anode catalysts with different weight proportions of $LaCrO_3$, VOx and YSZ.

| | $LaCrO_3$:VOx:YSZ | | | | |
|---|---|---|---|---|---|
| | 80:0:20 | 40:40:20 | 20:60:20 | 0:60:40 | 0:80:20 |
| Maximum Power Density | 40 mW | 260 mW | 210 mW | 100 mW | 160 mW |

TABLE 4

Typical coal gas composition (Vol. %).

| $H_2$ | CO | $CH_4$ | $CO_2$ | $H_2O$ | Sulfur | Other |
|---|---|---|---|---|---|---|
| 28-30 | 62-65 | <0.5 | 1.6-2 | 0.4-2 | 0.126-0.4 | 0.1-3.1 |

FULL CITATIONS FOR DOCUMENTS REFERRED TO IN THE SPECIFICATION

[1] X. Q. Wang, G. N. Ou, Y. Z. Yuan, Huaxue Xuebao, 62(18) (2004) 1695-1700.
[2] L. Chen, B. Yang, X. Zhang, W. Dong, K. Cao, Cuihua Xuebao, 26(11) (2005) 1027-1030.
[3] W. Daniell, A. Ponchel, S. Kuba, F. Anderle, T. Weingand, D. H. Gregory,
H. Knoezinger, Topics in Catalysis, 20(1-4) (2002) 65-74.
[4] J. D. Lee, N. K. Park, J. H. Jun, S. O. Ryu, T. J. Lee, Proceedings-Annual International Pittsburgh Coal Conference, 21st, (2004) 23.2/1-23.2/15.
[5] T. Katagiri, Y. Nakamura, Japan. Patent 08187430 A2 19960723.
[6] D. W. Park, B. G. Kim, Proceedings-KORUS 2003, the Korea-Russia International Symposium on Science and Technology, 7th, 4 (2003) 123-129.
[7] Y. Wang, Z. Liu, Zhenyu; L. Zhan, Z. Huang, Q. Liu, Q, J. Ma, Chem. Eng. Sci. 59(22-23) (2004) 5283-5290.
[8] N. M. Zink, A. M. Meier, K. S. Weil, J. S. Hardy, Ceram. Eng. Sci. Proc. 26(3) (2005) 341-348.
[9] N. I. Khramushin, G. S. Mezheritsky, J. I. Moskalev, I. N. Prilezhaeva, I. A. Rezvykh, A. N. Ryzkov, Proceedings of the World Hydrogen Energy Conference, 12th, Buenos Aires, 3 (1998) 2119-2128.
[10]. S. P. Yoon, J. Han, S. W. Nam, T. H. Lim, S. A. Hong, J. Power Sources, 136 (2004) 30-36.
[11]. T. Horita, N. Sakai, T. Kawada, H. Yokokawa, M. Dokiya, U.S. Pat. No. 6,1893,896, Feb. 6, 2001.
[12]. J. D. Carter, U.S. Pat. No. 5,803,934, Sep. 8, 1998.
[13]. O. A. Marina, L. R. Pederson, U.S. Patent Application Publication No. US2005/025000.
[14] O. Costa-Nunes, R. J. Gorte, J. M. Vohs, J. Power Sources, 141 (2005) 241-49.
[15] L. Aguilar, S. Zha, Z. Cheng, J. Winnick, M. Liu, J. Power Sources, 135 (2004) 17-24.
[16] R. Mukundan, E. L. Brosha, F. H. Garzon, Electrochem. and Solid-State Letters, 7(1) (2004) A5-A7.
[17] M. Liu, G. L. Wei, J. L. Luo, A. R. Sanger, K. T. Chuang, J. Electrochem. Soc., 150(8) (2003) A1025-A1029.
[18] Y. Lu, L. Schaefer, J. Power Sources, 135 (2004) 184-91.
[19] S. P. Jiang, L. Liu, K. P. Ong, P. Wu, J. Li, J. Pu, J. Power Sources, 176 (2008) 82-89.
[20] P. H. Duvigneaud, P. Pilate, F. Cambier, J. Eur. Ceram. Soc., 14 (1994) 359-367.
[21] M. Liu, P. He, J. L. Luo, A. R. Sanger, K. T. Chuang, J. Power Sources, 94 (2001) 20-25.

We claim:

1. An anode composite catalyst, wherein the composite catalyst comprises $LaCrO_3$ or doped $LaCrO_3$, a vanadium oxide and a solid electrolyte.

2. The anode composite catalyst according to claim 1, wherein the vanadium oxide is of the chemical formula $VO_x$, where x is a number indicating the proportional amount of oxygen present in the oxide.

3. The anode composite catalyst according to claim 2, wherein x is from about 0.5 to about 3.

4. The anode composite catalyst according to claim 3, wherein x is about 1.5.

5. The anode composite catalyst according to claim 2, wherein the $VO_x$ is obtained by the reduction of $V_2O_5$.

6. The anode composite catalyst according to claim 5, wherein the $V_2O_5$ is reduced by reaction with hydrogen ($H_2$) gas at a temperature of about 400° C. to about 500° C., for a period of about 6 hours to about 10 hours.

7. The anode composite catalyst according to claim 6, wherein the $V_2O_5$ is reduced with hydrogen ($H_2$) gas at a temperature of about 450° C.

8. The anode composite catalyst according to claim 6, wherein the $V_2O_5$ is reduced with hydrogen ($H_2$) gas for a period of about 8 hours.

9. The anode composite catalyst according to claim 1, wherein the solid electrolyte is yttria-stabilized zirconia (YSZ).

10. The anode composite catalyst according to claim 9, wherein the YSZ is 8 mol % YSZ nano-powder.

11. The anode composite catalyst according to claim 1, wherein the doped $LaCrO_3$ is $LaCrO_3$ doped with a promoter.

12. The anode composite catalyst according to claim 11, wherein the doped $LaCrO_3$ is a material having a formula of $La_{1-y}M_yCrO_{3-0.5y}$, where y is from about 0 to about 0.5.

13. The anode composite catalyst according to claim 1, comprising $LaCrO_3$ or doped $LaCrO_3$ in an amount of about 10% to about 50% by weight, vanadium oxide in an amount of about 30% to about 70% by weight and a solid electrolyte in an amount of about 10% to about 30% by weight.

14. The anode composite catalyst according to claim 1, further comprising an additive.

15. The anode composite catalyst according to claim 14, wherein the additive is selected from a promoter, an alkali metal salt, a stabilizer, a diluent, an electronic conductor, an ion conductor, a hardener and a surface area agent.

16. The anode composite catalyst according to claim 15, wherein the alkali metal salt is a potassium salt.

17. A solid oxide fuel cell (SOFC) comprising:
(a) an anode comprising an anode composite catalyst according to claim 1;
(b) a cathode; and
(c) an electrolyte providing ionic conduction between the anode and the cathode.

18. A method of preparing an anode composite catalyst comprising:
(a) combining $LaCrO_3$ or doped $LaCrO_3$, a vanadium oxide and a solid electrolyte in a solvent; and
(b) allowing the combination from (a) to dry.

19. The method according to claim 18, wherein the vanadium oxide, $LaCrO_3$ or doped $LaCrO_3$ and solid electrolyte are combined in the solvent in an ultrasonic bath.

20. The method according to claim 18, wherein the solvent is an alcohol.

21. The method according to claim 20, wherein the solvent is isopropanol.

22. The method according to claim 18, wherein the doped $LaCrO_3$ is $LaCrO_3$ doped with a promoter.

23. The method according to claim 22, wherein the doped $LaCrO_3$ is a material having a formula of $La_{1-y}M_yCrO_{3-0.5y}$, where y is from about 0 to about 0.5 and where M is a metal.

24. The method according to claim 18, wherein the anode composite catalyst is prepared using $LaCrO_3$ or doped $LaCrO_3$ in an amount of about 10% to about 50% by weight, vanadium oxide in an amount of about 30% to about 70% by weight and a solid electrolyte in an amount of about 10% to about 30% by weight.

25. The method according to claim 18, wherein the combined vanadium oxide, $LaCrO_3$ or doped $LaCrO_3$ and solid electrolyte are dried by evaporation of the solvent.

26. A method of oxidizing a hydrogen containing fuel comprising passing a gas stream comprising the fuel through a SOFC, wherein the SOFC comprises an anode catalyst according to claim 1.

27. The method of oxidizing a hydrogen containing fuel according to claim 26, wherein the hydrogen containing fuel also contains at least one of carbon monoxide, hydrogen sulfide or a hydrocarbon.

28. The method of oxidizing a hydrogen containing fuel according to claim 26, wherein the hydrogen containing fuel further comprises carbon monoxide.

29. The method of oxidizing a hydrogen containing fuel according to claim 28, wherein the carbon monoxide is present in the fuel in an amount from about 0.5% to about 60%.

30. The method of oxidizing a hydrogen containing fuel according to claim 29, wherein the carbon monoxide is present in the fuel in an amount from about 20% to about 50%.

31. The method of oxidizing a hydrogen containing fuel according to claim 26, wherein the hydrogen containing fuel is syngas.

32. The method of oxidizing a hydrogen containing fuel according to claim 31, wherein the gas stream is humidified.

* * * * *

UNITED STATES PATENT AND TRADEMARK OFFICE
CERTIFICATE OF CORRECTION

PATENT NO. : 8,318,384 B2
APPLICATION NO. : 12/597808
DATED : November 27, 2012
INVENTOR(S) : Jing-Li Luo et al.

It is certified that error appears in the above-identified patent and that said Letters Patent is hereby corrected as shown below:

Column 2, lines 41-42, replace "chromium." with "lanthanum (La).";

Column 3, lines 17-18, replace "chromium." with "lanthanum (La).";

Column 7, lines 13-14, replace "chromium." with "lanthanum (La).";

Column 8, lines 30-31, replace "chromium." with "lanthanum (La).".

Signed and Sealed this
Second Day of April, 2013

Teresa Stanek Rea
*Acting Director of the United States Patent and Trademark Office*